Figure 1:
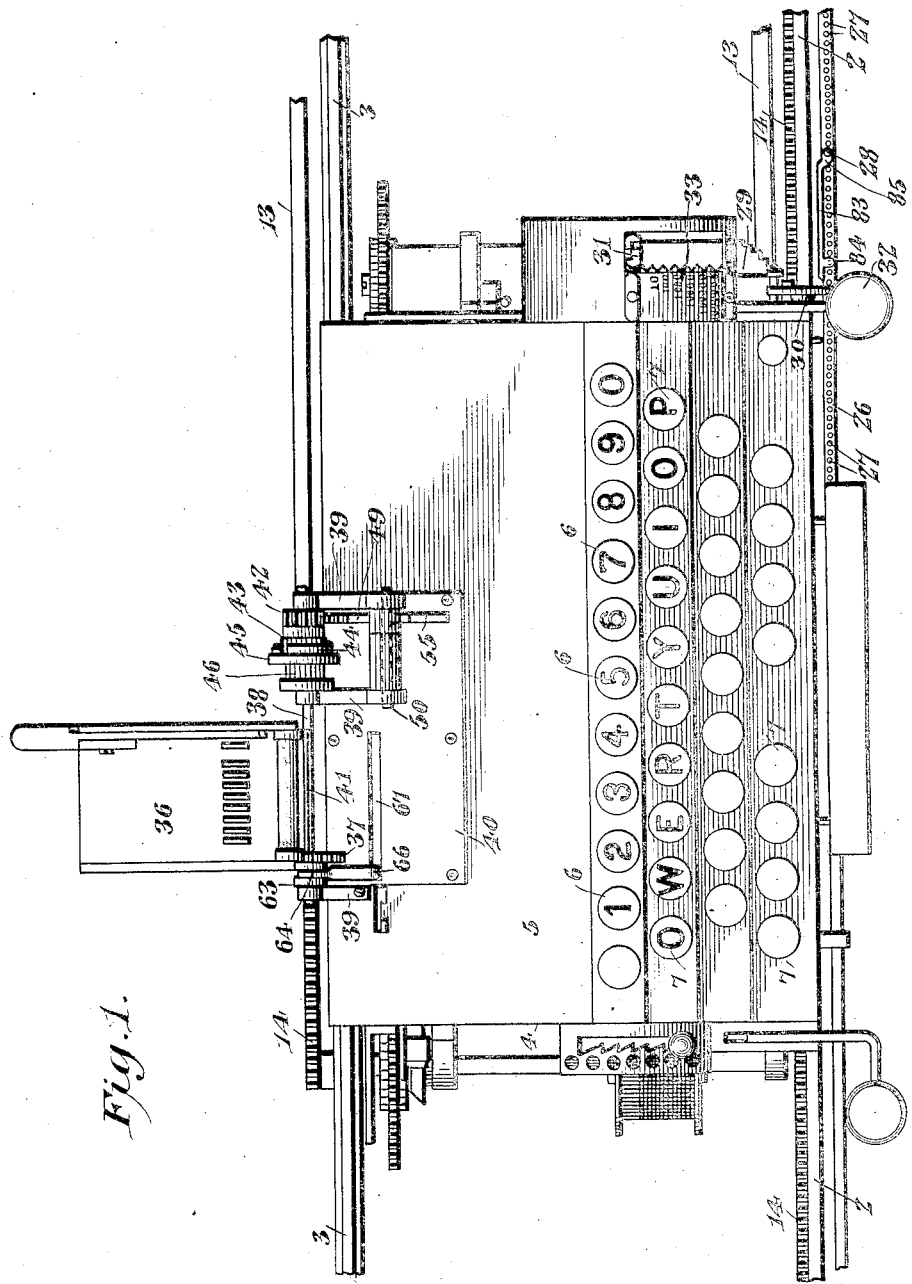

No. 856,349. PATENTED JUNE 11, 1907.
L. G. JULIHN.
CALCULATING MACHINE.
APPLICATION FILED OCT. 7, 1904.

13 SHEETS—SHEET 1.

Witnesses
Jas. T. McCathran
B. G. Foster

Louis G. Julihn, Inventor
By C. G. Siggers
Attorney

No. 856,349. PATENTED JUNE 11, 1907.
L. G. JULIHN.
CALCULATING MACHINE.
APPLICATION FILED OCT. 7, 1904.

13 SHEETS—SHEET 3.

Witnesses
Jas. K. McCathran
B. G. Foster

Louis G. Julihn, Inventor
By C. G. Siggers
Attorney

No. 856,349. PATENTED JUNE 11, 1907.
L. G. JULIHN.
CALCULATING MACHINE.
APPLICATION FILED OCT. 7, 1904.
13 SHEETS—SHEET 5.
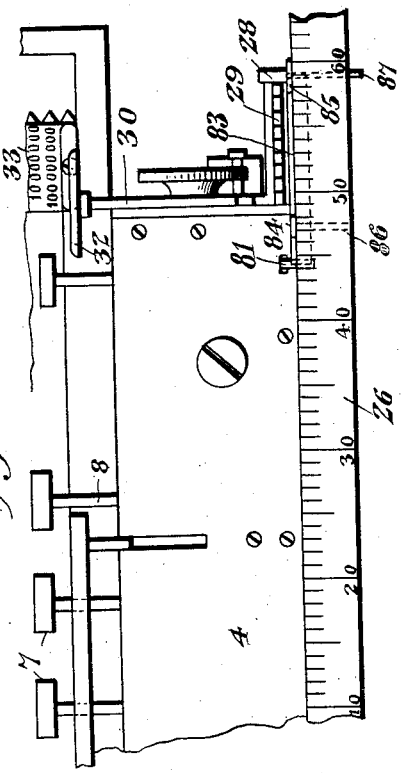
Fig. 5.
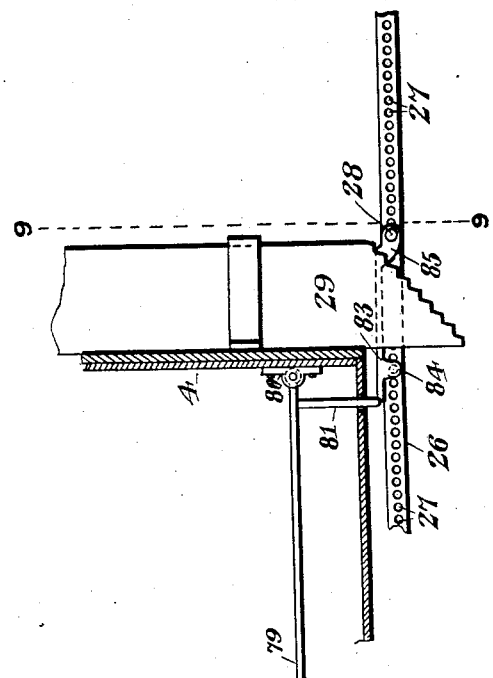
Fig. 6.
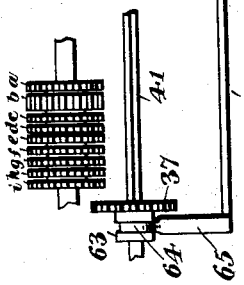
Witnesses
Jas. L. M?Cathran
B. G. Foster
Louis G. Julihn, Inventor
By C. G. Siggers
Attorney No. 856,349. PATENTED JUNE 11, 1907.
L. G. JULIHN.
CALCULATING MACHINE.
APPLICATION FILED OCT. 7, 1904.
13 SHEETS—SHEET 6.
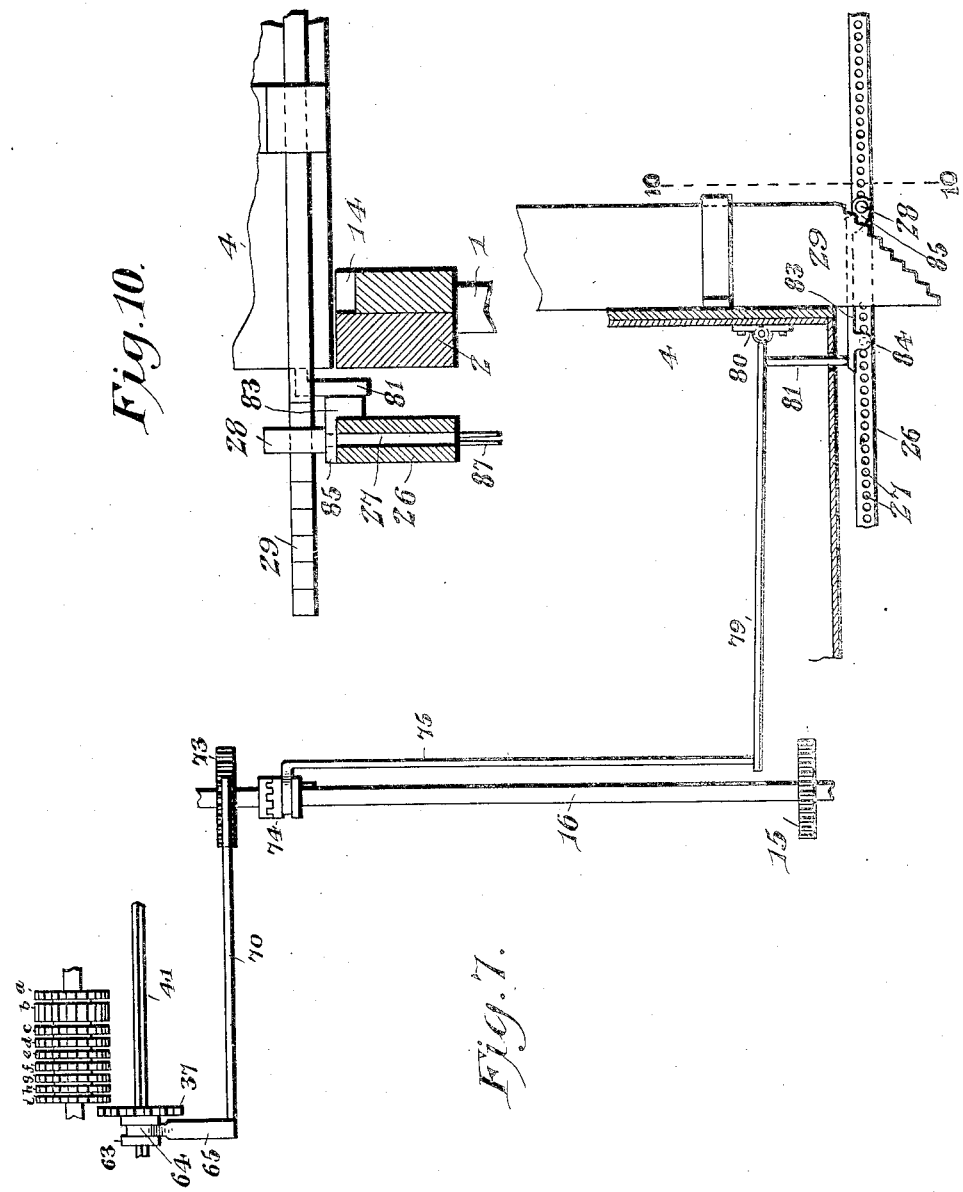

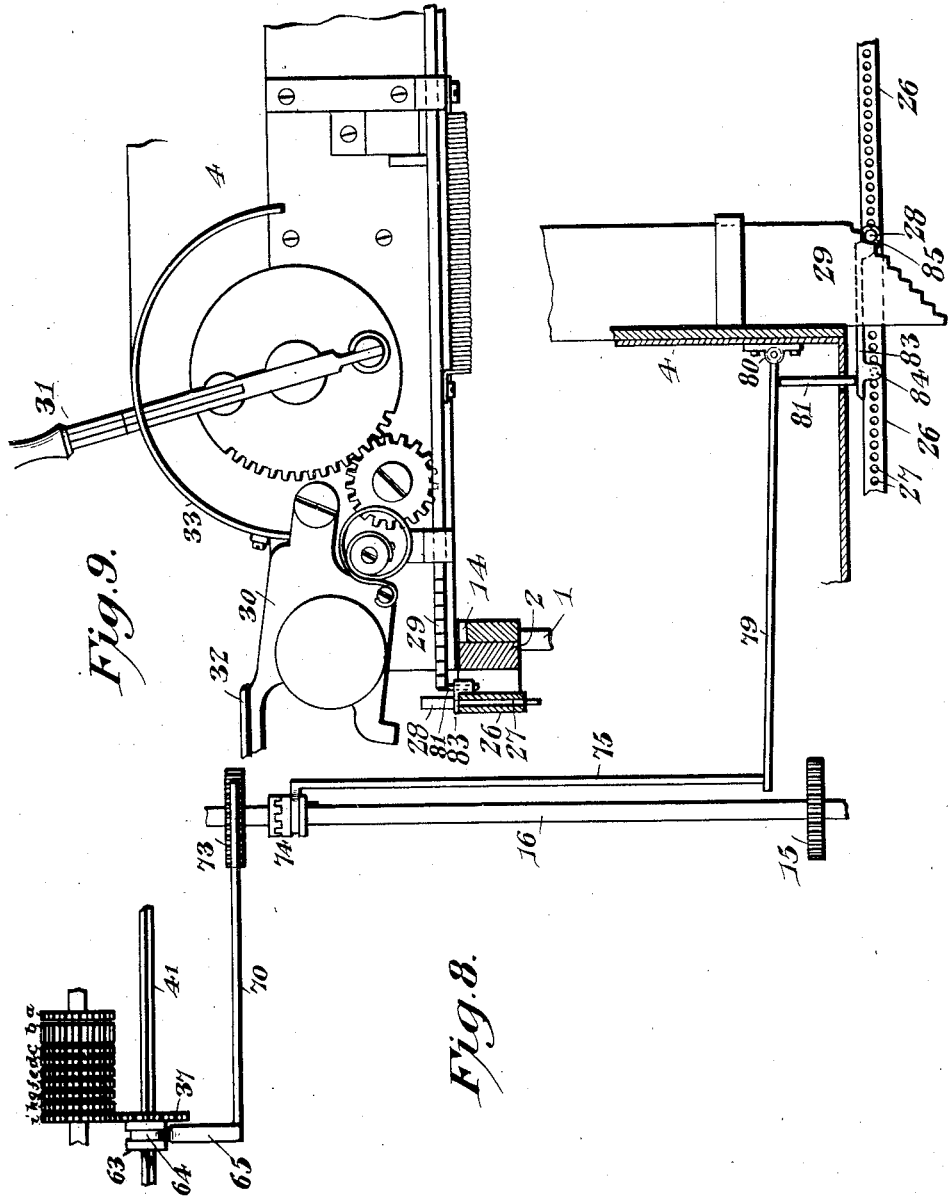

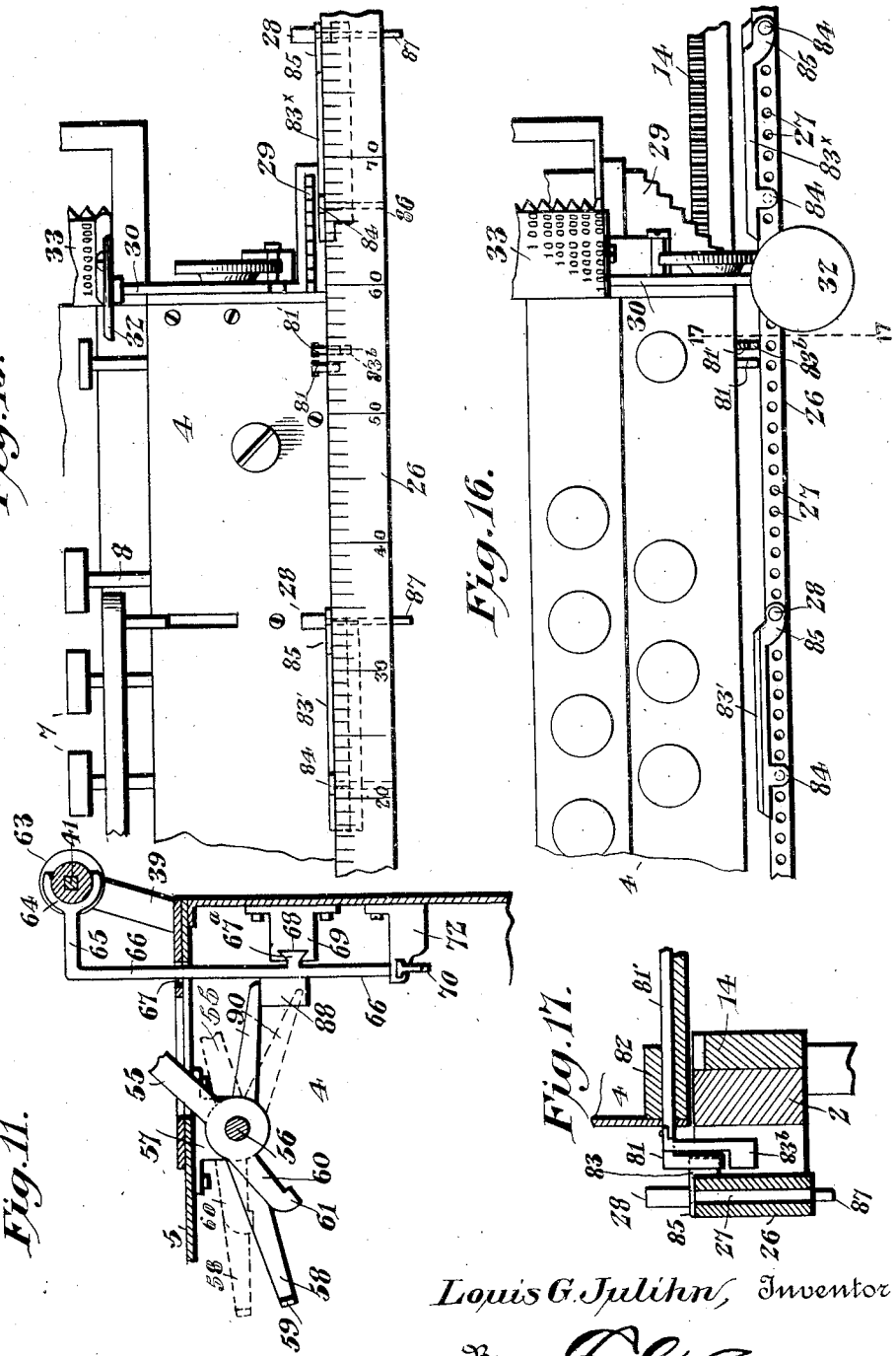

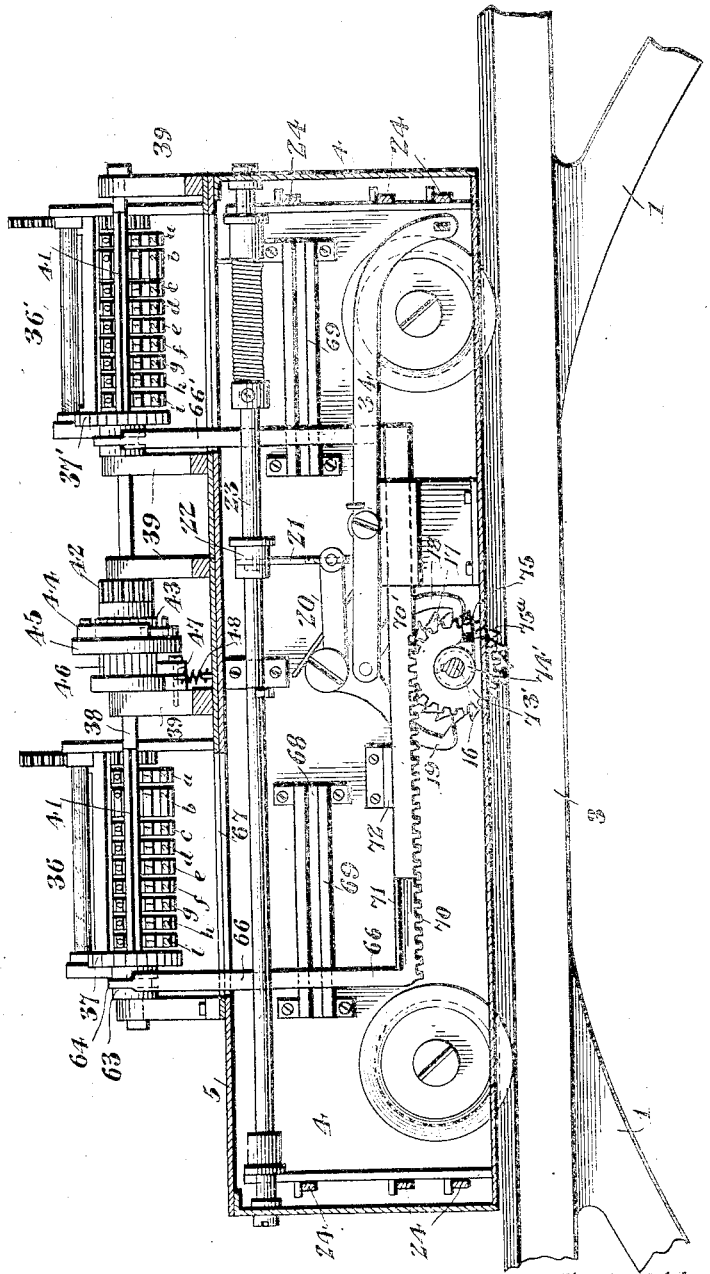

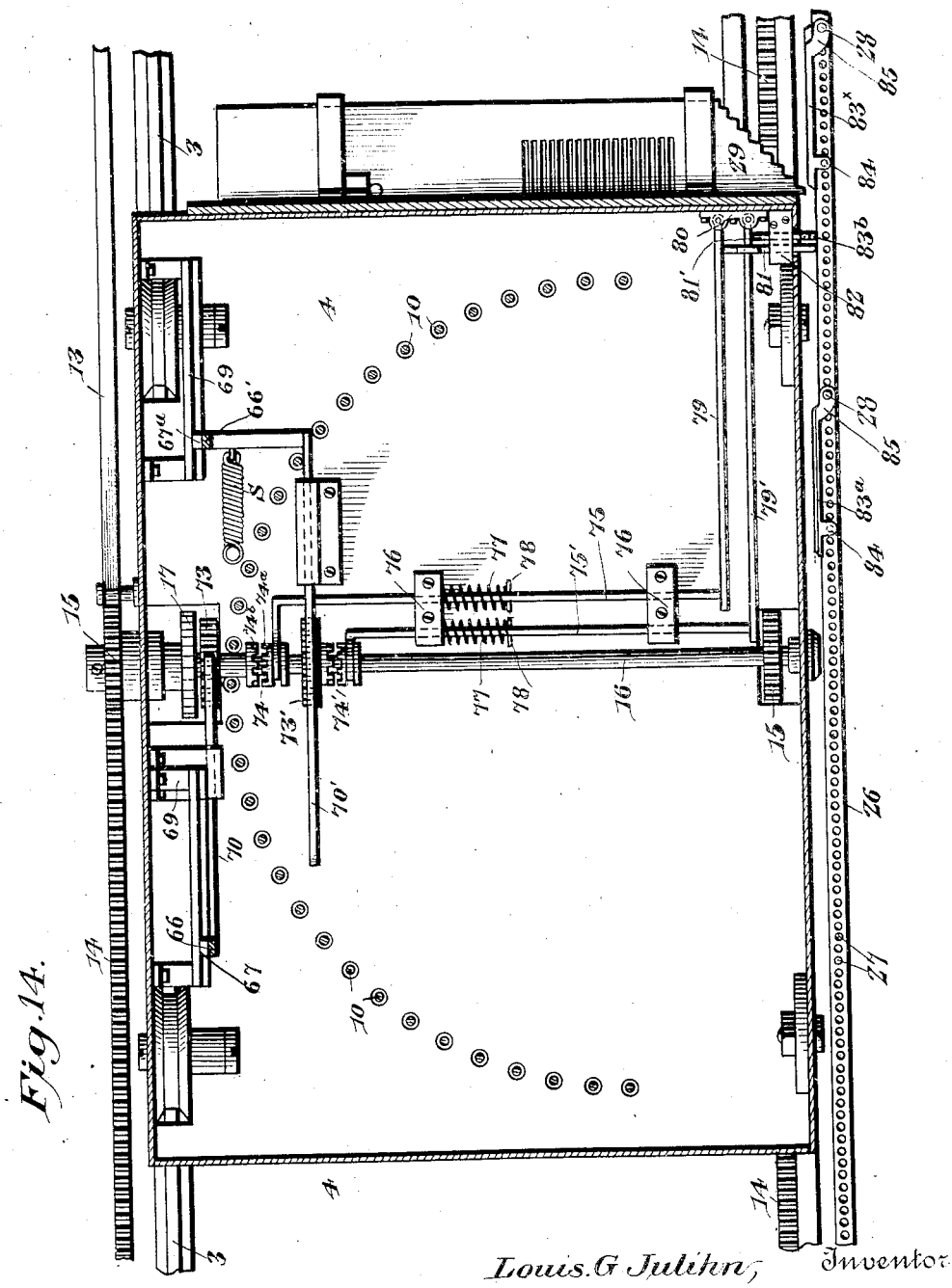

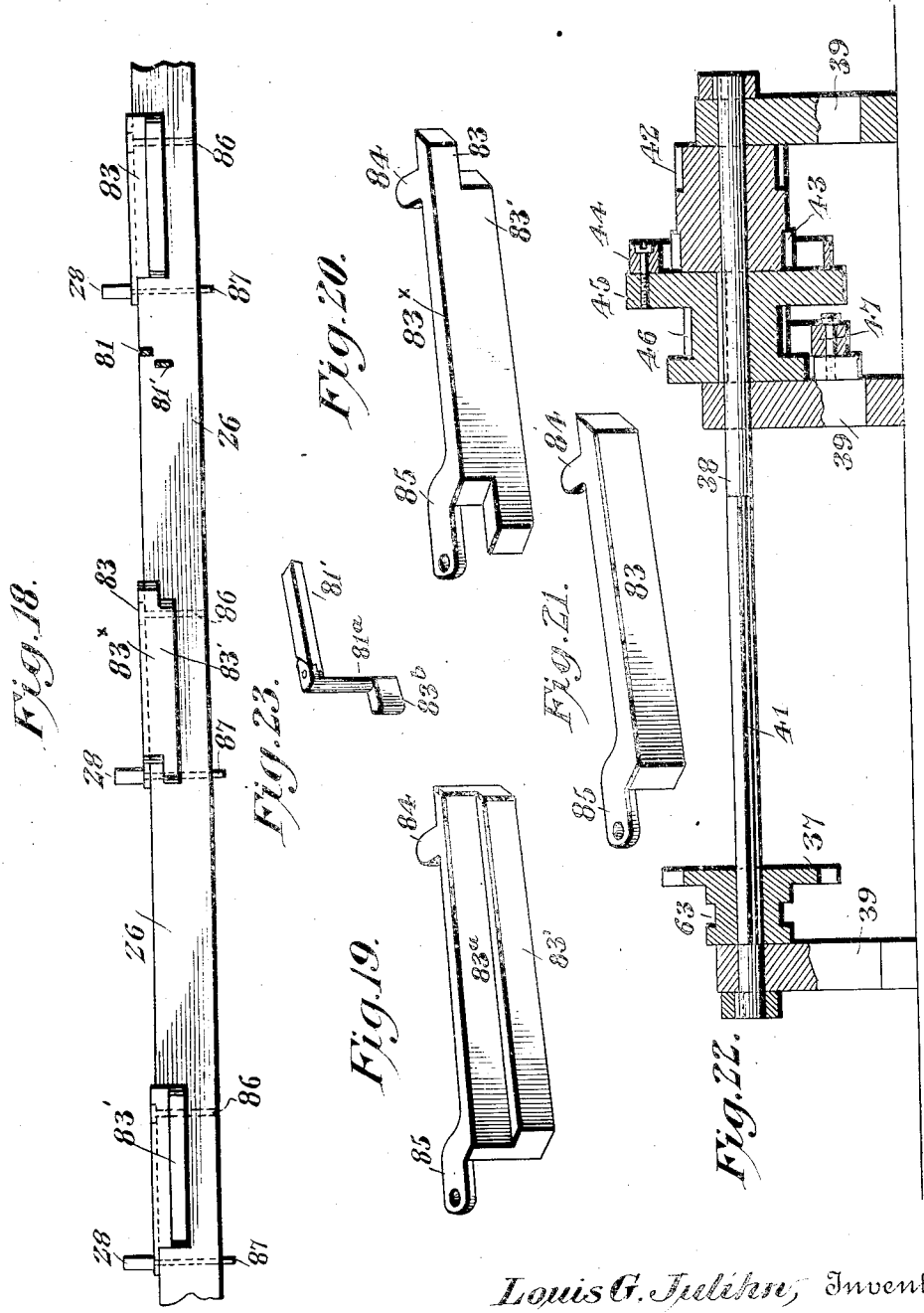

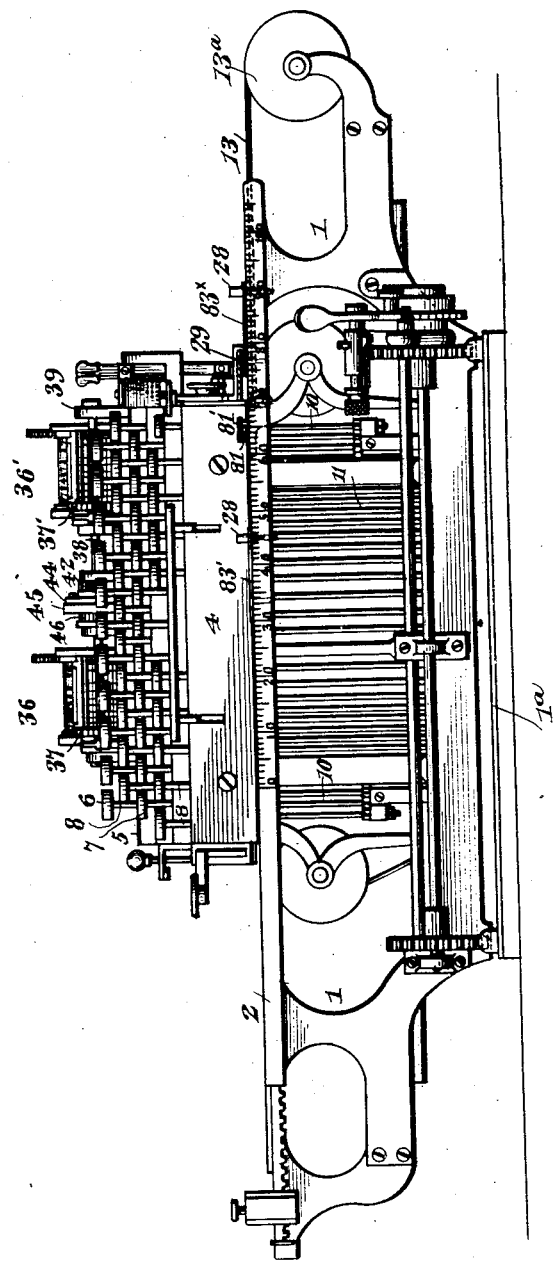

UNITED STATES PATENT OFFICE.

LOUIS G. JULIHN, OF WASHINGTON, DISTRICT OF COLUMBIA, ASSIGNOR TO ELLIOTT-FISHER COMPANY, OF NEW YORK, N. Y., A CORPORATION OF DELAWARE.

CALCULATING-MACHINE.

No. 856,349.      Specification of Letters Patent.      Patented June 11, 1907.

Application filed October 7, 1904. Serial No. 227,571.

*To all whom it may concern:*

Be it known that I, LOUIS G. JULIHN, a citizen of the United States, residing at Washington, in the District of Columbia, have invented a new and useful Calculating-Machine, of which the following is a specification.

This invention relates to a calculating machine, but more particularly to a combined recording, calculating and registering machine adapted to print numbers, to effect a computation embracing the values represented thereby, and to register the result of the computation.

In a more specific aspect, the invention relates to a combined calculating and typewriting machine, embodying a platen and key-operated printing mechanism, relatively movable for letter and line spacing.

In the illustrated embodiment of the invention, the machine includes in its organization a flat platen or book typewriter characterized by a movable carriage supporting the printing mechanism and keys, which latter operate the printing mechanism and the computing device simultaneously, and control the movement of the carriage to effect denominational spacing of the digits printed and to maintain a corresponding denominational relation between the computing device and its operating mechanism.

The primary objects of the invention may be stated as follows: 1. To enable the computing device and its operating mechanism to travel in unison in the direction of denominational spacing. 2. To mount the computing device and its operating mechanism upon a movable carriage in order to avoid the accurate adjustments necessitated by the mounting of the computing device and its operating mechanism upon different supports which are relatively movable. 3. To provide printing mechanism and a computing device coöperatively related and movable in unison opposite the sheet to be printed upon. 4. To permit the computing device and its operating keys to travel in unison and to have their denominational relation changed by such travel. 5. To mount the computing device and key-operated printing mechanism upon a traveling carriage, which is controlled by the keys to effect denominational spacing of the digits printed and to cause the keys to be operatively related to the corresponding denominational members of the computing device. 6. To provide a typewriting machine with a computing device and its operating means both mounted on the typewriter carriage. 7. To provide a typewriting machine, the carriage of which supports both the recording and computing mechanism. 8. To provide a typewriter with a computing device and with means mounted independently of the typewriter carriage for causing the computing device to be rendered operative at any desired point in the travel of the carriage, according to the location of the numbers on the work sheet. 9. To provide a typewriting machine with a computing device and with column selective means adjustable on the frame of the typewriter to determine the location of the adding field or that portion or period of the carriage travel during which the computing device may be operated. 10. To provide a computing device and printing mechanism mounted to travel in unison over a work sheet, and combined with means for automatically establishing an operative relation between the printing mechanism and the computing device at any desired point in the travel thereof. 11. To provide a typewriter with a computing device and with column selective means for determining the location of the column to be totalized, and denominational selective means for determining the denomination of a digit to be printed and the denominational relation of the computing device and its operating mechanism. 12. To provide a typewriting machine with a computing device and with tabulating mechanism including a column stop with which is adjustable a device for rendering the computing device operative, whereby the adjustment of the column stop serves to determine the location of a column on the work sheet and to insure the operation of the computing device during the printing of digits in such column. 13. To provide a typewriting machine with one or more column totalizers and with a grand totalizer, one or more of said totalizers being mounted on the typewriter carriage. 14. To mount a plurality of computing devices on a typewriter carriage and to provide means for rendering said totalizers operative at the proper point or points in the travel of the carriage.

Various objects, in addition to those already enumerated, will appear during the succeeding description of the illustrated constructions.

Figure 2:
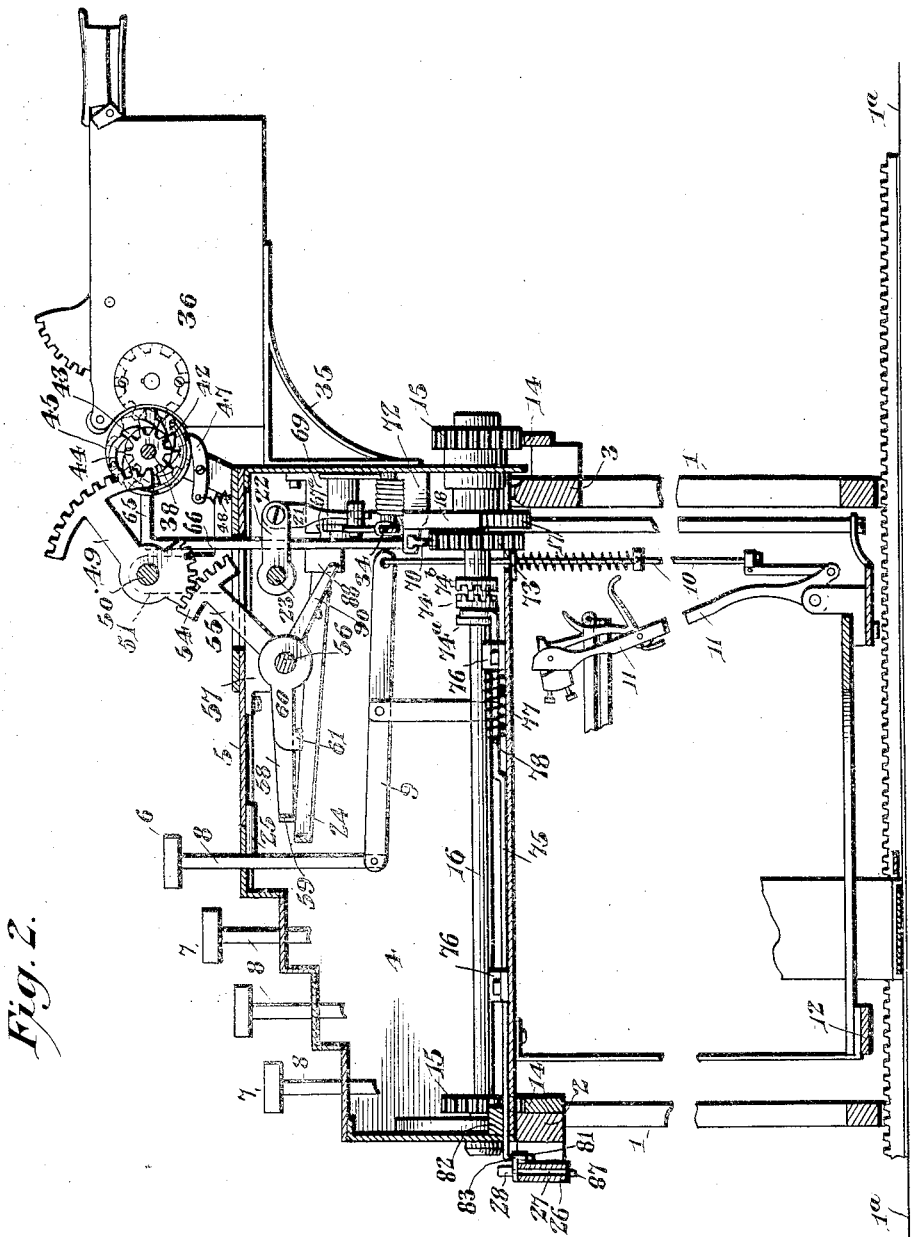
Figure 3:
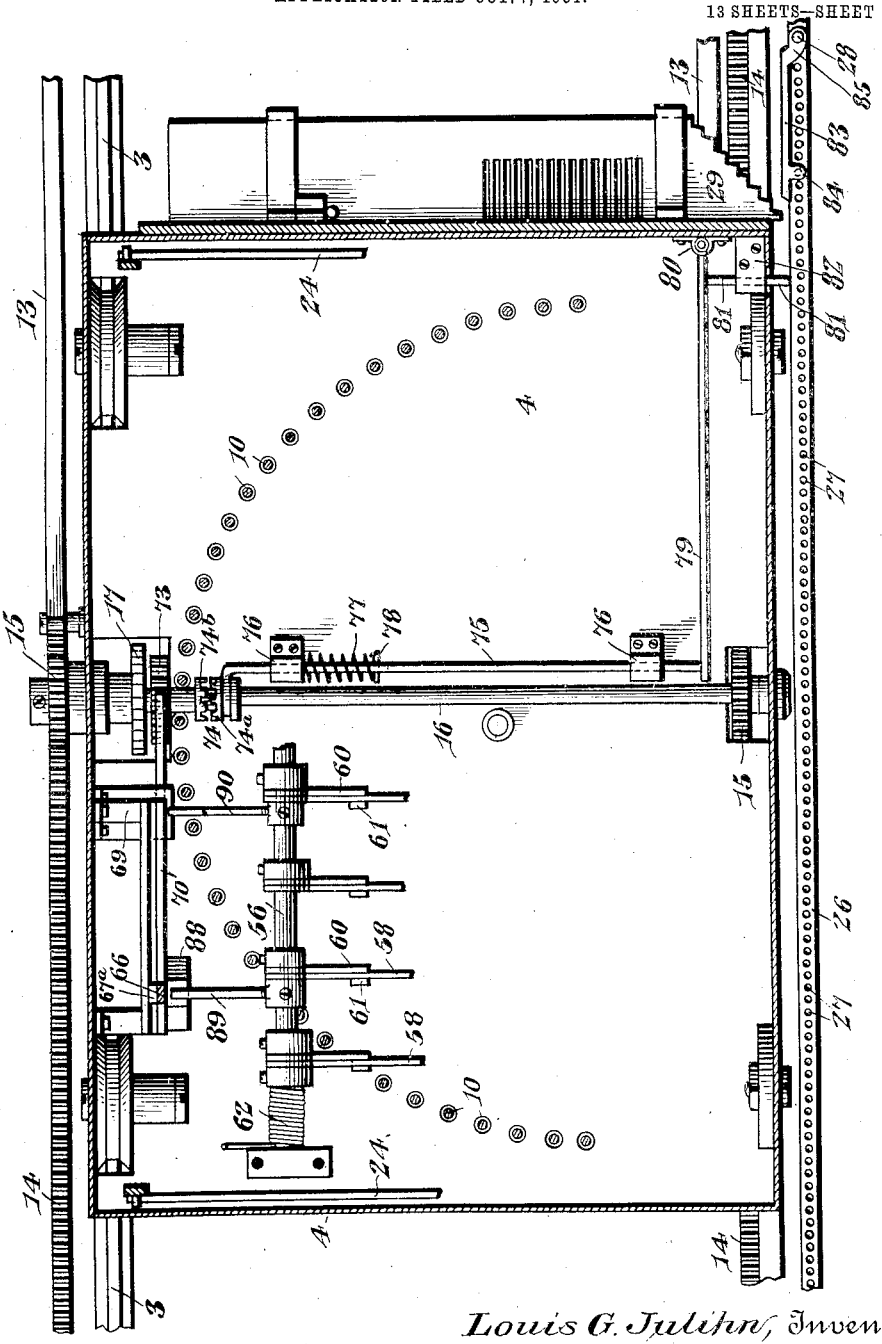
Figure 4:
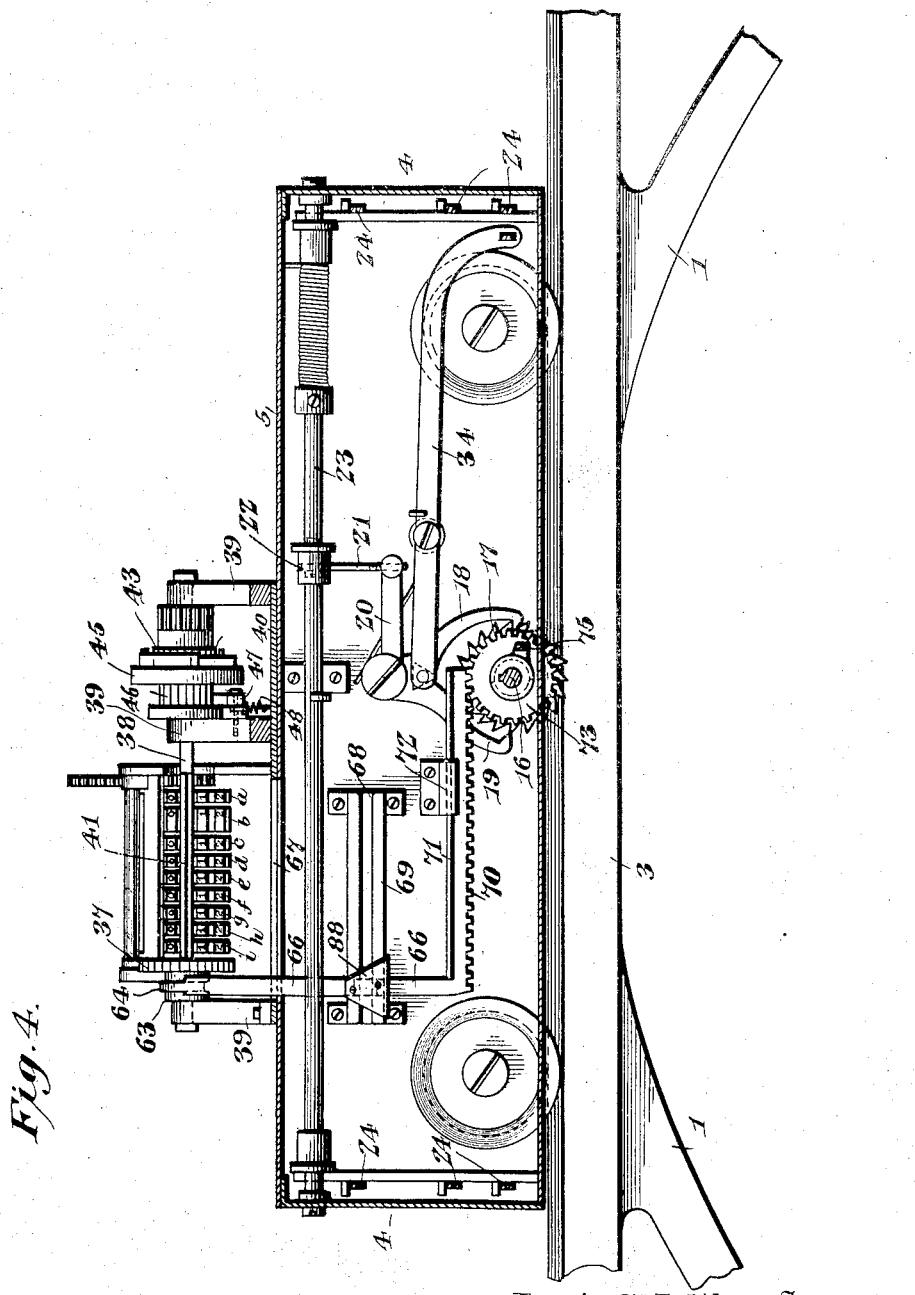
Figure 13:
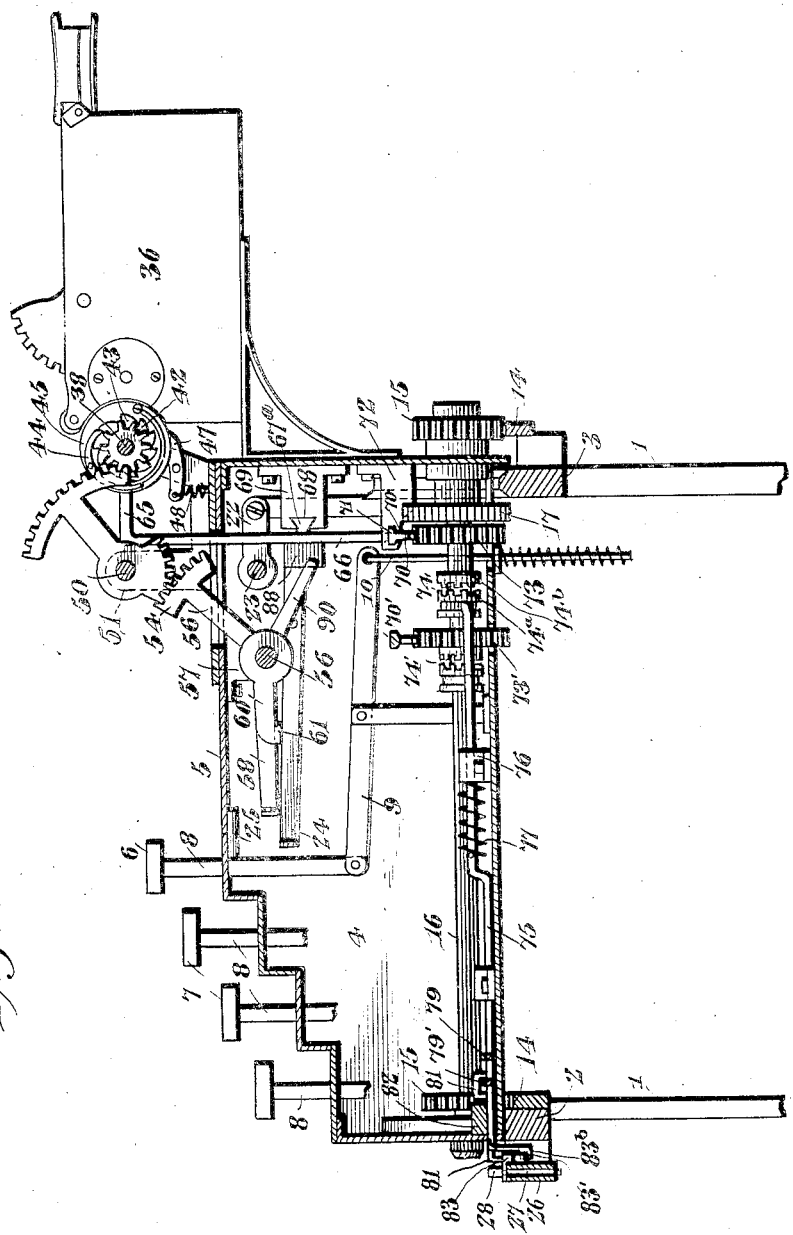

In the accompanying drawings, Figure 1 is a plan view of a portion of an Elliott-Fisher typewriter equipped in accordance with my invention. Fig. 2 is a vertical sectional view of the same subject-matter. Fig. 3 is a horizontal section through the carriage casing to disclose the interior construction, a portion only of which is shown. Fig. 4 is a longitudinal sectional view designed more particularly to show the master wheel advancing mechanism and the cam for relieving the keys when the printing point of the machine moves out of a column. Fig. 5 is a front elevation of a portion of a carriage, showing the relation of the tabulating mechanism with respect to the trip and trigger of the mechanism controlling the operative relation between the master wheel and the computing device. Fig. 6 is a detail plan view more or less diagrammatic in character, and showing the relation of the trigger and trip when the printing point of the typewriter reaches a position two steps to the left of the column to be totalized. Fig. 7 is a similar view illustrating the manner in which the clutch members are thrown into engagement as the printing point advances to a position one step or letter space removed from a column. Fig. 8 is still another view of this general character showing how, when the carriage is arrested with its printing point opposite the millions order of the column by the engagement of the variable catch with the column stop, the master wheel will be in engagement with the number wheel or digit carrier of highest order, and how, when this relation of the parts is established, the master wheel advancing mechanism will be retained in operative connection with the carriage feed spindle to insure the advance of the master wheel to successive number wheels as the printing point of the carriage advances from order to order of the column. Fig. 9 is a detail section on the line 9—9 of Fig. 6, the variable catch being shown retracted. Fig. 10 is a similar view on the line 10—10 of Fig. 7. Fig. 11 is a sectional view of the rear side of the carriage casing showing the mounting of certain elements of the master wheel advancing mechanism and the relation of the relief cam to the master wheel operating connections. Fig. 12 is a sectional view similar to Fig. 4, but showing the carriage equipped with a plurality of computing devices or totalizers, one of which may be utilized as a column totalizer and the other as a grand computing device. Fig. 13 is a transverse sectional view similar to Fig. 2, but disclosing the duplication of clutches, triggers, and master wheel advancing racks necessitated by the employment of the two computing devices shown in Fig. 12. Fig. 14 is a sectional plan view similar to Fig. 3, but showing the duplicate arrangement. Fig. 15 is a front elevation similar to Fig. 5 with the trips arranged in a manner to constitute one of the computing devices as a column computing device for totalizing a single column and the other as a grand computing device for computing the grand total of a plurality of columns, including the column totalized by the computing device first named. Fig. 16 is a plan view of the subject-matter of Fig. 15. Fig. 17 is a section on the line 17—17 of Fig. 16. Fig. 18 is a rear elevation of the column stop bar shown in Fig. 15. Figs. 19, 20, and 21 are detail perspective views of the combined trips and column stops. Fig. 22 is a detail section through the master wheel shaft and associated parts. Fig. 23 is a detail view, illustrating the hinged outer end of the trigger for the grand computing device, and Fig. 24 is a front elevation of a complete Elliott-Fisher typewriter equipped in accordance with my invention.

The same reference character is applied to the corresponding part throughout the views.

The present invention embodies several features believed to be broadly novel in calculating machines and in combined calculating and recording machines, aside from those characteristics of the illustrated structure which identify it with typewriting machines. This novelty will be defined in the subjoined claims, but as the ultimate end of the invention is the improvement of a combined typewriting and calculating machine, I have selected for the purposes of this disclosure, an Elliott-Fisher typewriter of a type popularly known as the Fisher, and exemplified, for instance, in Patent No. 573,868 to R. J. Fisher. As the general arrangement of the Fisher machine must be understood, in order to properly comprehend the present improvements, a general description thereof will be first in order.

*The Fisher typewriter.* This machine is of the flat platen type and includes a traveling carriage, movable both longitudinally and transversely of the platen, and carrying printing mechanism, which includes both letter and numeral types and operating keys therefor.

The machine frame 1 is mounted to travel longitudinally of a stationary flat platen 1ª the writing surface of which is indicated in Fig. 2. The frame 1 is provided with front and rear carriage guides 2 and 3 which slidably support a carriage 4 movable transversely of the platen and supporting the printing mechanism. The upper portion of the carriage 4 is in the form of a casing 5, above which are exposed the numeral and letter keys 6 and 7, having stems 8 connected at their lower ends to key levers 9 fulcrumed within the carriage casing and connected in turn, through draw wires 10, with downwardly swinging type bars 11 carried by a type ring 12 pendent from the carriage casing, as shown in Fig. 2. The carriage 4 is moved to the right by a carriage propelling mechanism including carriage tapes 13 connected at their inner ends to the carriage and at their outer ends to spring drums 13a mounted on the machine frame 1. The steps by-step advance of the carriage in the direction of letter spacing, to-wit, to the right, is controlled by mechanism which includes in its organization a pair of racks 14 rigidly associated with the carriage guides 2 and 3 and meshing with carriage pinions 15 fixed to a feed spindle 16 extending transversely of the carriage (see Fig. 2) and carrying the escapement wheel 17, see Figs. 2 and 3. This escapement wheel is in the form of a ratchet and constitutes the rack element of an escapement by the operation of which the step-by-step advance of the carriage, under the impulse of the carriage propelling mechanism, is permitted. In addition to the escapement wheel 17, the escapement includes holding and spacing dogs 18 and 19 disposed for alternate engagement with the teeth of the wheel 17. Normally, the holding dog engages the ratchet wheel and holds the same, thus preventing the forward movement of the carriage. When, however, the dogs are swung, the holding dog moves out of engagement with the wheel, but before the disengagement is effected, the spacing dog moves into engagement. Such movement of the parts is effected by the depression of a key to print. When the key is released, however, the movement of the dogs is reversed, and, while the spacing dog is moving out of engagement with the wheel, and before the holding dog moves into engagement therewith, the wheel is permitted to rotate an almost inappreciable distance so that the dog, instead of moving back into engagement with the flat face of the tooth before engaged by it, will engage the next succeeding tooth when the spacing dog has moved back sufficiently to release the wheel and thus permit the partial rotation thereof and the advance of the carriage the distance of one letter space.

The operating mechanism between the keys and the escapement includes an arm 20 extending from the spacing dog and connected by a link 21 to an arm 22 projecting from a rock shaft 23 extending longitudinally of the carriage adjacent to its rear wall, see Figs. 2 and 4. This rock shaft is vibrated by key yokes 24 mounted to swing within the casing and operated by the keys, each key stem being equipped with a pin 25 arranged to engage and swing a yoke 24 just as the key reaches the limit of its downward movement. It will thus be apparent that the complete depression of a key will effect the swinging of a yoke 24 to rock the shaft 23 and thus shift the escapement dogs, the release of the key serving to permit the dogs to swing back to their initial positions for the purpose of permitting the feed of the carriage.

*The tabulating mechanism or denominational selective means.* As the Fisher machine is arranged to print upon a work element supported in a flat, spread-out condition upon the platen, it is well adapted for tabulation, and it therefore embraces in its general organization what is commonly known as tabulating mechanism or denominational selective means. This mechanism is designed to facilitate the rapid movement of the carriage from column to column and its accurate location with its printing point opposite any order of any column in which it is desired to make an entry. This tabulating mechanism includes a straight scale bar or column stop bar 26 secured to the front carriage guide 22 and provided with the usual space scale over which the carriage indicator or pointer moves in a manner well understood. The bar 26 is provided with a longitudinal series of pin openings 27 corresponding in position to the graduations on the scale and designed for the reception of pins, the upper ends of which project above the bar and constitute column stops 28 varying in number according to the number of columns to be printed on the sheet.

The carriage is equipped at its right hand end with two tabulator catches, to-wit, a variable or denominational catch 29 and a single unit catch 30 designed to be operated by catch keys 31 and 32. These catches are normally removed from interfering relation with the column stops, but by the depression of its key, either catch may be moved to a position which will cause it, when moving with the carriage, to traverse a path obstructed by a column stop. The column stop for a given column is ordinarily so located that when the carriage is arrested by the use of the single unit catch it will be in position to print in the units order of the column. The variable or denominational catch, however, is, as will be seen, by reference more particularly to Fig. 3, in the form of a plunger having a series of stepped shoulders each of which is separated from the next the distance of one letter space. Therefore, by projecting this catch more or less, any one of its several shoulders may be positioned to engage the column stop and thus arrest the carriage at any denominational distance therefrom, that is to say, with the printing point of the carriage opposite any desired order of the column at the left of the decimal point or space.

To facilitate the positioning of the denominational catch, a scale plate 33 is associated with the key 31 and is provided with graduations, as shown. Both of the keys 31 and 32 are operatively related to the release lever 34, see Fig. 4, which serves, when vibrated, to swing both dogs of the escapement out of engagement with the wheel 17 so as to release the carriage and thus permit its free advance until arrested by the tabulating mechanism. Since the tabulating mechanism and its connections have only been indicated in a general way in the accompanying drawings, reference is made for a further detailed disclosure to Patents 666,762 to Charles F. Laganke and 723,937 to John A. Smith.

The foregoing is a sufficient description of the general organization of the typewriting machine and of those features thereof which are more or less intimately related to the present invention, and it is next in order to explain the relation of the computing device to said machine.

*The general relation of the computing device and the typewriting machine.* Secured to the casing 5 of the typewriter carriage 4 and extending rearwardly therefrom, is a supporting bracket 35 to which is rigidly fixed what is variously known as a register, totalizer, or computing device 36. The computing device 36 may be of any suitable construction, but that shown is substantially what is known as a Laganke and Smith register exemplified in Patent No. 825,469. It includes a casing containing computing and registering mechanism, including, as is usual in this class of devices, a series of digit denominational members, carriers or number wheels $a, b, c, d, e, f, g, h$ and $i$, having the denominational value of, and designed to register hundredths, tenths, units, tens, hundreds, thousands, ten-thousands, hundred-thousands, and millions, the tenths wheel being of double width to accommodate the decimal space. Each of these wheels is provided upon its periphery with the digits 0 to 9 inclusive, preferably displayed upon the end faces of the peripheral teeth, one digit of each wheel being observable through a sight opening extending across the upper front corner of the casing and preferably protected by a magnifying sight glass. Each carrier or wheel is arranged to make nine-tenths of a complete revolution independently of the other wheels, to present its digits successively before the sight glass, and during its last increment of movement engages the adjacent wheel to the left, to-wit, the wheel of next higher denomination, and moves it a single increment or step, after which the wheel first named may again rotate independently for nine-tenths of a complete rotation before again advancing the adjacent wheel to the left a single step. Since the wheels of the entire series are related to one another in the manner stated, it follows that mechanical computations in addition may be effected by moving the wheels, corresponding in order or denomination to the order or denomination of the digits composing the numbers to be added, a number of increments corresponding to the unitary values of such digits. Thus, if it is desired to add 432 and 234, the wheels of the computing device being "set" or "clear," that is to say, the ciphers of all the wheels being disposed opposite the sight glass, the wheel of the third order or denomination, to-wit, the hundreds wheel $e$ will be rotated four increments (it is immaterial whether this movement be intermittent or continuous) presenting the digit 4 opposite the sight glass; the tens wheel $d$ of the second order or denomination will be rotated three increments and the units wheel $c$ of the first order two increments or steps. The numerals observable through the sight glass will now read 432 corresponding to the first number. The second number 234 will now be added by imparting to the third order wheel $e$ two additional increments of movement, to the second wheel $d$ three increments and to the first order wheel $c$ four increments, thus causing the numerals presented before the sight glass to read 666, the sums of the two numbers, it being observed that in the foregoing operation each of these three wheels has been moved six increments and that each wheel registers the number of increments it has moved. Since the numerical value of each order or denomination is 10, that is to say, ten times the value of the next lower order or denomination, and since each wheel during its last increment of movement will, as heretofore explained, impart a single increment of movement to the next adjacent wheel to the left, it follows that when the number registered reaches the limit of the numerical value of a given order the rotation of the adjacent wheel to the left will effect the registration of a digit of the next higher order or denomination. Thus, assuming the first order or digit wheel $c$ to be given nine increments of movement causing the presentation of the digit "9" opposite the sight glass, the next or tenth increment of movement will present the "0" on said wheel before the sight opening and by the automatic engagement of the wheel $c$ with the wheel $d$ of the next higher or second order, the latter will be moved a single increment to present the digit "1" of the second order before the glass, the presentation of the two digits "0" and "1" in the first and second orders effecting the registration of the number 10. It follows, from the described relation of the digit carriers or number wheels, that any total within the capacity of the register may be arrived at by successive operations of a single wheel, or by the operation of a plurality of wheels. Thus units may be added until the register displays 9,999,999.99, since each number wheel or digit carrier, when it reaches the limit of its capacity, will transfer the result of its computation to the wheel of next higher order or denomination, and similarly, a summation may be effected by imparting directly to the various number wheels corresponding in denomination to the denominations of the numbers to be added, a number of increments corresponding to the unitary value of the digit or digits embraced by those numbers.

It should be understood, however, that the members, which have been variously designated as digit carriers or number wheels, need not directly carry the digits or have the form of wheels, since, in the broader aspect of the invention, it is sufficient that they occupy different denominational positions and that they cause the display of different digits and are concerned in the computation to be effected.

*The master wheel and the operating connections therefor.* The number wheels or digit carriers of the computing device are designed to be operated by a master wheel 37, which, as the printing point of the typewriting machine advances from order to order of the column, is automatically advanced into engagement with the number wheels of corresponding order or denomination. Thus, whenever the printing point of the machine is opposite the units order, for instance, of the column, the master wheel will be in engagement with the units wheel e and will advance in either direction across the computing device as the printing point of the carriage advances in either direction across the column. This master wheel is the primary element of the actuating mechanism for the computing device and is designed to rotate the number wheels or digit carriers of appropriate denominations in proportion to the numerical values of the digits embraced by the computation. The means for rotating the master wheel includes the numeral keys of the typewriter, although it is obvious that, viewing the invention as a calculating machine, it is immaterial whether the keys perform any function other than the actuation of the master wheel.

The master wheel 37 is mounted on a master wheel shaft 38 located at the rear of the carriage and supported above the same by a plurality of brackets 39 which preferably have a common base plate 40 secured in any suitable manner to the top of the carriage casing 5. The master wheel shaft 38 is designed to rotate and is formed with a squared portion 41 extending through a corresponding opening in the master wheel 37 so that, while said wheel is compelled to rotate with the shaft, it may be moved independently along the shaft to successively engage the various number wheels or digit carriers of the computing device.

Rotatably mounted on the shaft 38, preferably at one end thereof, is a pinion 42, to one side of which is fixed a ratchet wheel 43. When the pinion is rotated, by instrumentalities to be described, the teeth of the ratchet wheel 43 engage the beak of a spring-urged pawl 44 mounted on one side face of a disk 45 fixed to the master wheel shaft 38 and having associated therewith a ratchet wheel 46. The teeth of the ratchet wheel 46 are reversely disposed with respect to the teeth of the ratchet wheel 43 and are engaged by a check pawl 47, preferably mounted on one of the brackets 39, as shown in Figs. 2 and 4, and urged to its engaging position by a spring 48. Thus, when the pinion 42 is rotated in one direction the shaft 38 of the master wheel will move therewith, but upon the retraction or reverse rotation of the pinion 42, the master wheel shaft and the master wheel will be held against reverse movement by the check pawl 47. The operating connection between the numeral keys 6 and the pinion 42 includes an actuating lever 49, see Fig. 2, mounted on a short shaft 50 carried by supports 51 upstanding from the base plate 40. This lever 49 is fulcrumed adjacent to its front end and is formed at its opposite extremities with toothed segments, the former meshing with the pinion 42 and the latter with the toothed segment or rack 54 carried at the extremity of a rack arm 55 projecting through the top of the carriage casing from a rock shaft 56 mounted in bearing brackets 57 pendent from the top or cover of the carriage casing, see Figs. 2 and 3. This rock shaft 56 constitutes a motion transmitting element mounted within the carriage casing and common to all the numeral keys. That is to say, the numeral keys of the typewriter are each designed to impart a different degree of movement to the shaft 56 for the purpose of transmitting, through the latter and its intermediate connections, such movement to the master wheel as will serve to advance a digit carrier or number wheel a number of increments corresponding to the unitary value of the key.

The operating connections between the keys and the rock shaft comprehend a series of loose arms 58 extending laterally from the shaft 56 and having angular ends 59 disposed to be engaged by the pins or projections 25 on the key stems, see Fig. 2. Adjacent to each loose arm 58, the shaft 56 is equipped with a comparatively short, fixed arm 60 provided with a lateral extension 61 disposed under the adjacent loose arm 58 so that, when the latter is swung down by the depression of a key, it will engage the fixed arm and thus swing the latter and effect a partial rotation of the shaft 56. Normally all of the key stem pins 25 are in engagement with the top of the carriage casing, as shown in Fig. 3, thereby serving to limit the upward movement of the keys. Since the movement of all of the keys are uniform in extent and since the key stems are all normally disposed in the same horizontal plane, provision is made for the differential movement of the shaft 56 in correspondence with the values of the several digits represented by the numeral keys. Such provision comprehends the graduated arrangement of the arms 58 and 60. Thus, the arm 58 at the extreme left hand end of the series will be normally disposed at a sufficient distance below the stem pin of the "1" key to permit independent movement of the key during eight-ninths of its stroke, after which the pin contacts with the angular end 59 of the arm 58 and swings it and the adjacent arm 60 to rock the shaft 56. This movement of the rock shaft is sufficient to effect one increment of movement of the master wheel and a similar movement of the digit carrier in mesh therewith. The several arms 58 to the right of the one whose operation has just been described are located progressively in higher planes so that the movement of said arms, and hence the movement of the rock shaft and the operative connections between it and the master wheel, will be increased in accordance with the increase in numerical value of the keys. Retractile movement of the shaft 56 to its normal position is effected by a retracting spring 62, see Fig. 3.

The described mechanism for transmitting motion from the keys to the pinion 42 is not original with me. If desired, any other approved mechanism for transmitting motion to the master wheel shaft from the keys may be employed in lieu of that shown.

In order to simplify this disclosure as much as possible, I have omitted the mechanisms usually employed for preventing over-running of the master wheel and for holding the master wheel operating connections against retraction when a key rises from an incomplete stroke.

*The master wheel advancing mechanism.* It is now in order to describe what is believed to be a radical departure in machines of this character, to-wit, the advance of a master wheel or actuator mounted on a moving carriage, into co-operative relation with the successive denominational members, number wheels or digit carriers of a computing device also mounted on and movable with the carriage.

It has been stated that the master wheel 37 is slidably mounted on the squared portion 41 of the master wheel shaft 38, and it may now be stated that the advance of the master wheel along the shaft to present it to successive number wheels is designed to be effected by the movement of the carriage, the motive power for such advance of the master wheel being thus supplied by the carriage propelling mechanism. The grooved hub 63 of the master wheel 37 is engaged by a spanner or yoke 64 carried at the rear extremity of the horizontally disposed end 65 of a vertical master wheel advancing arm 66 extending through and movable laterally within a longitudinal slot 67 in the top of the carriage casing 5. At a point intermediate of its ends the arm 66 is equipped with a dove-tailed slide 67ª engaging a correspondingly formed groove or way 68 in a guide 69, preferably secured to and projecting inwardly from the rear wall of the casing 5 to brace and guide the arm 66 during such movement of the latter as is necessary to effect the advance of the master wheel back and forth across the computing device.

Extending horizontally from the master wheel advancing arm 66 is what may be termed the master wheel rack 70, formed at its upper edge with a longitudinal enlargement 71, slidably engaging a correspondingly formed way in a guide 72 which, like the guide 69, is preferably secured to the back wall of the carriage casing and projects inwardly therefrom, as shown in Figs. 2 and 4. The master wheel rack 70 meshes, as shown in Fig. 4, with the upper side of a master wheel advancing pinion 73 loosely mounted on the carriage feed spindle 16 and corresponding in diameter with the feed pinions 15 which latter, as heretofore explained, are fixed to the spindle and rotate in mesh with the relatively fixed racks 14 as the carriage advances. The master wheel advancing pinion 73 is designed to be intermittently connected with the spindle 16 by a mechanism to be hereinafter described, and when so connected, will rotate with the spindle to cause the advance of the rack 70 and the consequent advance of the master wheel a corresponding distance.

Attention is now particularly directed to the fact that both the computing device and the master wheel advance with the carriage and that the master wheel must, therefore, advance more rapidly than the carriage and the computing device fixed thereto, as it is obvious that the master wheel would otherwise remain in engagement with a given number wheel instead of advancing to the next number wheel during the advance of the carriage from one order of a column to the next.

As will be evident, the axis of the feed pinions bears a fixed relation to the carriage, and as these pinions travel along the fixed racks 14, it is obvious that the carriage will only advance the distance of the bodily travel of the feed pinions 15. The master wheel advancing rack 70, however, engages the periphery of the pinion 73 which, as before stated, corresponds in size with the pinions 15, and like said pinions, is fixed to the spindle 16. Therefore, while the carriage advances the distance of one letter space, determined by the bodily movement of the pinions, the rack advances two letter spaces, determined by the peripheral movement of the pinions. It will thus be seen that, as the computing device moves the distance of one step or letter space during the advance of the carriage from one order of a column to the next, the master wheel will advance the distance of two steps. Thus the relative movement of the master wheel with respect to the computing device will be one step, which will cause the advance of the master wheel from one digit carrier to the next, in order that the denomination of the carrier engaged will always correspond with the order or denomination of the column, opposite which the printing point of the machine is located.

It will appear from what has been said that the present invention embodies broadly a carriage supporting both the computing device and its operating connections and movable to change the denominational relation thereof. When considered in this broad aspect, it is immaterial whether the change in denominational relation is effected by a master actuator presented to successive denominational members or whether some entirely different character of mechanism is employed for determining the particular member to be operated in accordance with the position occupied by the carriage. It is sufficient that the position of the carriage determines the particular denominational member to be operated and that the members and their operating means are movable with the carriage in the direction of denominational spacing.

*The column selective means whereby the machine may be set to totalize a column or columns located at any desired point or points on the work sheet.* As heretofore stated, one of the primary objects of the invention is to provide means located accessibly at the front of the machine and arranged to be set simultaneously with the setting of the column stops of the tabulator mechanism, to determine the periods in the relative movement of the platen and printing mechanism, during which the computing device will be operated. In furtherance of this end, a clutch 74, comprising clutch members 74$^a$ and 74$^b$, is mounted on the feed spindle 16 and is designed to connect the master wheel advancing pinion 73 with the spindle when the clutch members are thrown into engagement. The member 74$^b$ is fixed to the pinion 73 and is loosely revoluble therewith on the spindle. The member 74$^a$, on the contrary, is splined on the spindle so as to rotate therewith although capable of movement into and out of engagement with the member 74$^b$. The clutch member 74$^a$ is designed to be operated by a clutch rod 75, preferably disposed parallel with the spindle 16, as shown in Fig. 3, and guided in suitable bearings 76 mounted on the bottom of the carriage casing. Normally the clutch members are retained out of engagement by a spring 77 preferably encircling the rod 75 between one of the bearings 76 and a projection 78 on the rod.

Adjacent to the front of the casing the front end of the clutch rod 75 bears against the free outer end of what may be termed the clutch lever, 79, disposed longitudinally of the casing, and fulcrumed at its opposite extremity in a bracket 80, preferably located at the extreme right hand end of the casing, as shown in Fig. 3. Projecting through the front wall of the carriage casing adjacent to the right hand end thereof is a reciprocatory trigger 81 guided in a suitable bearing 82 and having its rear end engaging the lever 79. The trigger 81 is designed to be tripped or urged inward by one or more trips or column selective devices 83 mounted on the column stop bar 26, as shown in Fig. 3, and preferably in the form of beveled-ended blocks approximately coincident in length with the width of a column or adding field. When so tripped, the inward movement of the trigger from its normal plane swings the lever 79, which in turn urges the clutch rod 75 longitudinally against the resistance of the spring 77 and thus operates the clutch 74 to connect the master wheel advancing pinion 73 with the spindle 16. During the subsequent advance of the carriage the rotation of the pinion 73 with the spindle will cause the master wheel to be advanced across the computing device 36 in the manner heretofore described, because the trigger 81 will be held by the trip against outward movement during the advance of the printing point of the carriage across the column to be totalized. As soon, however, as the trigger reaches the end of the trip, the spring 77 will return the trigger to its normal plane and operate the clutch 74 to disconnect the master wheel advancing mechanism from the carriage feed spindle so that the numeral keys may be depressed to print outside of the column being totalized without effecting the actuation of the computing device. Similarly, the retraction of the carriage will cause the trigger to be tripped by engagement with the trip and thus the master wheel will be moved across the computing device in a reverse direction, that is to say, from right to left, as the printing point of the machine moves back across the column. Therefore, whenever the printing point of the machine is located opposite the adding field or column being totalized, no matter whether the carriage is moving to the right or left or whether its movement is free or step-by-step, the master wheel will always be in engagement with the digit carrier of that denomination appropriate to the location of the printing point of the machine.

In the present embodiment of the invention it is contemplated to leave the master wheel one step beyond either end of the series of digit carriers when the printing point of the carriage moves beyond one side or the other of the column. The trip 83 is therefore so arranged that, when the machine reaches a point two steps removed from the highest order of the column or from the lowest order thereof, as the case may be, the trigger will be in position to engage the trip during the next movement of the carriage toward the column. When the key, which is now struck, rises, the carriage feeds forward, presenting the trigger to the trip and causing said trigger to move back from its normal plane and to throw the clutch members into engagement in the manner heretofore recited. Thus, when the carriage comes to rest with its printing point one step removed from the column, the master wheel advancing mechanism will be in engagement with the feed spindle 16. The next advance of the machine the distance of one letter space will carry the printing point thereof to a position opposite the highest or lowest order of the column, accordingly as the carriage advances to the right or left, as the case may be. The same movement will cause the advance of the master wheel into mesh with the digit carrier of highest or lowest denomination and if, while the printing point is located within the limits of the column, a numeral key is struck and a digit printed, the digit carrier corresponding in denomination to the denominational position of the digit in the column will be rotated a number of increments or units of movement corresponding to the unitary value of such digit.

While it is not essential that the trip or trips 83 be intimately associated with the column stops, as it is obvious that such trips may be employed in a machine which is not equipped with tabulating mechanism, I prefer, nevertheless, to employ combined column stops and trips, as shown. For instance, in Fig. 19 is shown a trip 83 in the form of an oblong block having beveled ends to facilitate the riding of the trigger thereover, and also having extended forwardly from its upper edge a pair of comparatively thin lugs 84 and 85. The trip is designed to rest against the rear face of the column stop bar 26 with the lugs 84 and 85 extended over and supported upon the bar. The trip is retained in place by pins 86 and 87 depending from the lugs and extended into two of the pin openings 27 in the bar 26, the pin 87 being extended above a lug to constitute a column stop 28. The pin 87, therefore, assists in the retention of the trip and acts as a column stop and furthermore facilitates the accurate location of the trip since the pin is located at that point of the trip which corresponds to the decimal space of the column. Therefore, the operator, after ascertaining the point on the work sheet at which he desires the decimal point of a given column to fall, is enabled by the use of the scale on the front of the column stop bar to insert the pin 87 in the bar at the proper point and thus simultaneously position the column stop of the tabulating mechanism and the trip of the calculating mechanism. In other words, by combining the column stop and trip in the manner specified, the operator simply locates the column stop at the proper point on the column stop bar, just as is ordinarily done for tabulating work, and no other operation is required, such for instance, as the shifting of the computing device to a position opposite the proper column.

In the operation of the machine, when the entries to the left of the column have been made, and the operator is ready to enter a number in the column, he simply moves forward or depresses the key 31 of the variable catch 29 until the key is opposite the proper denomination on the scale plate 33, just as is done in using the tabulating mechanism of a typewriter which is not equipped with a computing device. Having thus operated the key to effect the projection of the denominational catch 29 the proper distance, the key 31 is contracted, thus causing the operation of the release lever 34 and the withdrawal of the dogs from the wheel 17 in a manner which is well understood by those skilled in the art. The carriage being thus released, will move swiftly to the right until arrested by the contact of the appropriate shoulder of the catch 29 with the column stop 28 associated with the trip, see Fig. 8. The tabulator key is now released, restoring the engagement of the holding dog with the escapement wheel 17 which will retain the carriage with its printing point opposite that denomination in the column which has been determined by the manipulation of the tabulator key. As we have already seen that the master wheel is automatically moved into engagement with a digit carrier whenever the printing point of the carriage moves into the column, it will now be evident that, by this simple manipulation of the tabulator mechanism in the usual manner, the proper location of the printing point with respect to the column, and of the master wheel with respect to the computing device, has been established. The operator now proceeds to make the entry in the column, and as the printing point moves to the right, beyond the column, the master wheel moves out of engagement with the computing device so that entries may be typewritten on the sheet without affecting the actuation of the digit carriers.

At this point attention may be directed to the fact that what has been described as the tabulating mechanism constitutes denominational selective means, for the reason that by the manipulation thereof, the carriage is arrested in position to print a digit in any desired denominational position or order of a column and to render operative the corresponding denominational member of the computing device by presenting the master wheel in coöperative relation therewith.

Similarly, the trips adjustable on the column stop bar constitute column selective means, since by their adjustment, they select the location of the column or columns on the work sheet by determining the period or periods of the carriage travel during which the computing device will be rendered operative by the keys. In other words, the location of the trip determines the location of the column, and the adjustment of the variable catch of the tabulating mechanism determines the denominational relation of the printing point to the column and the denominational relation of the master wheel to the computing device.

*The means for relieving the numeral keys when printing outside of the column being totalized.* We have seen that the wheel moves out of engagement with the computing device whenever the printing point of the machine moves beyond the column on the work sheet, and thus the described mechanism comprehends means for automatically connecting and disconnecting the computing device and its operating mechanism at the proper times. While it will thus be seen that the foregoing description comprehends a complete embodiment of my invention in one aspect thereof, it is desirable to entirely relieve the numeral keys of the burden imposed thereon by the master wheel operating connections, whenever the machine is in position to print outside of the column being totalized. To attain this end, I equip the master wheel advancing arm 66 with a double-ended relief cam 88 co-operating with a pair of arms 89 and 90 extending rearwardly from the rock shaft 56, as shown in Figs. 2, 3, 4 and 11. The arms 89 and 90 are so disposed that, as the master wheel advancing arm 66 reaches either limit of its movement, the cam 88 will ride under one of the arms and lift it to the full line position in Fig. 11. The arm thus swung will cause the shaft 56 to be rocked and the fixed arms 60 thereon to be depressed, thus permitting the loose arms 58 to drop down out of operative relation with the pins 25 projecting from the stems 8 of the numeral keys. As soon, however, as the arm 66 advances to present the master wheel to the computing device, the cam 88 will be withdrawn from the arm 89 or 90, as the case may be, thus permitting the operating connections to be restored to their normal positions by the spring 62 before the master wheel moves into mesh with a digit carrier of the computing device.

The idea of automatically relieving the numeral keys from the burden of the computing device operating connections to permit the unrestricted use of the typewriting machine when printing outside of the column being totalized, is not original with me. The described mechanism whereby the relief is effected is believed, however, to be novel.

*The arrangement for a plurality of totalizers.* In Figs. 12 to 18 inclusive, is illustrated a further development of the invention, which contemplates the employment of a plurality of totalizers or computing devices mounted on the traveling carriage and arranged to totalize separate columns. To attain this end, the master wheel shaft 38 is extended opposite a second computing device 36', shown in Fig. 12, at the right hand end of the carriage. Upon a second squared portion 41' of the master wheel shaft is mounted a second master wheel 37' arranged to be advanced across the computing device 36' by a second master wheel advancing arm 66' equipped with a master wheel rack 70' guided in suitable bearings and engaging a second master wheel advancing pinion 73', which, like the pinion 73, is loosely mounted on the spindle 16 and designed to be intermittently connected thereto by a clutch 74' operated by a clutch rod 75', in turn operated by a clutch lever 79' arranged parallel with the lever 79 and arranged to be operated by a trigger 81'. It will thus be seen that the equipment for the second computing device embraces a substantial duplication of the construction already described in connection with the use of a single device, except, that a single master wheel shaft serves for all the computing devices and that there is no necessity for a duplication of the mechanism for operating the shaft.

When a plurality of computing devices are employed, independent trips or selective devices for the master wheel advancing mechanisms thereof must, of course, be mounted on the column stop bar 26, and as the trigger of one computing device ordinarily must not be operated by the trip or trips of any other computing device or devices, the trips appropriate to the different devices are located in different horizontal as well as vertical planes on the bar. For instance, as shown in Fig. 18, the trip 83 for the computing device 36 is located at the upper edge of the bar 26, while the trip 83' has its effective projecting portion located in a horizontal plane below that of the trip 83. The outer end of the trigger 81 is arranged to move in a path entirely unobstructed by the trip 83', but obstructed by the trip 83, so that the clutch 74 of the computing device 36 will be operated only when the trigger 81 arrives opposite the trip 83.

The front end 81ᵃ of the trigger 81' is disposed vertically, as shown in Fig. 17, and lies normally in rear of the upper trip 83 so as to clear the same, but at the extremity of this vertical end is located a forwardly extending lug 83ᵇ which, as the carriage advances, is movable in a path obstructed by the trip 83'.

By this arrangement it will be observed that the trigger of each computing device moves in a path obstructed only by the trip appropriate to that device. It is therefore possible to set the trip of any computing device so as to cause the latter to totalize any desired column, without in any way affecting any other computing device whose trip may have been previously set. Thus, while the positions of the computing devices on the carriage are invariable, they may be caused to totalize columns located at variable distances apart by simply locating the trips at appropriate points.

In order that the trip 83′ may be equipped with a column stop and supported on the bar 26 in a manner similar to the support of the trip 83, said trip 83′ is formed, as shown in Fig. 19, with a thin web 83ª rising above the top of the trip at the front side thereof and connected with the lateral lugs 84 and 85 from which the pins depend. This web 83ª is disposed flat against the rear face of the column stop bar so as to be cleared by the trip 81 during the travel of the carriage and serves to suspend the trip proper 83′ in a plane below the upper trip 83, as already stated.

While I have shown a machine equipped with two computing devices, it is obvious that a greater number may be employed, it being simply necessary to locate the trips for the respective devices in different horizontal planes, and to so arrange the triggers that each will co-operate with the trip appropriate to its computing device and no other.

*The arrangement for computing the grand total of several columns.* It is sometimes desirable to compute the grand total of several columns of numbers printed on a work sheet, and the invention comprehends means whereby this end may be attained, regardless of the relative location of the columns. We have seen that an operative relation is established between the numeral keys of the typewriter and the digit carriers of a computing device whenever the printing point of the machine moves into a column for which a trip has been positioned on the column stop bar. It will therefore appear that if, in the path of the trigger of a given computing device a plurality of trips are mounted on the bar, said computing device will be brought into action whenever the printing point of the carriage moves into any one of the several columns corresponding in position with the several trips. For instance, with the trips arranged as shown in Fig. 18, the trigger 81′ of the computing device 36′ will move in a path obstructed by three trips and therefore, whenever a digit is printed in any one of three columns, the computing device 36′, which now takes the character of a grand computing device, will be correspondingly operated and the computation effected by it will embrace all the digits printed in the three specified columns. It will be observed, however, that when the computing device 36′ is to be utilized as a grand computing device common to several columns, it is not possible to leave the master wheel at the right hand side of said device when the printing point moves beyond a given column, because in that event, the master wheel would not be properly located to again traverse the computing device during the printing of numbers in a succeeding column. Therefore, a retracting spring S is connected to the advancing arm of the master wheel 37′ and to a relatively fixed part, so that, when the master wheel has traversed the computing device, it will be automatically retracted as soon as the trigger 81′ reaches the end of a trip. Having been thus retracted to its initial position at the left of the grand computing device, the master wheel 37′ will be in position to again traverse said device when its trigger 81′ is presented to a succeeding trip by the advance of the carriage to another column which is to be included in the grand computation. This provision for the automatic retraction of the grand master wheel necessitates a slight variation in the construction of the trigger 81′, since it will be apparent that the pinion which advances the grand master wheel must not be connected with the feed spindle of the carriage when the trigger 81′ traverses a trip during the retraction of the carriage to begin a new line of writing. This variation in the construction of the trigger resides in the hinging of the front end thereof as indicated at 81ª, see Figs. 14, 17 and 23, this hinge being of a character which will permit the end of the trigger to swing laterally when it engages a trip during the retraction of the carriage, but will prevent such swinging and thus cause the trigger to be urged inward to operate the clutch when said trigger engages a trip during the advance of the carriage to the right.

*The arrangement for computing the grand total of several columns and for simultaneously computing one or more individual column totals.* As each computing device or totalizer is independent of the other with respect to the time at which it shall be called into action, it is possible, by a proper arrangement of the trips on the column stop bar, to have one totalizer compute the grand total of a plurality of columns and to have another totalizer or other totalizers compute the total or totals of an individual column or of individual columns. Furthermore, the column or columns thus totalized may or may not be included in the computation effected by the grand totalizer. For instance, with a machine equipped with two totalizers as shown, and with the trips arranged as in Fig. 18, the totalizer 36′ will compute the grand total of three columns while the totalizer 36 will compute the total of the middle column, since the trigger of the totalizer 36 will be tripped as the printing point of the machine passes into the middle column, but will not be affected by the lower trips which bring the grand totalizer 36' into action when the machine moves into either of the other two columns.

It will be noted that when the machine is printing in the middle column, both totalizers 36 and 36' will be in action. This is for the reason that the triggers 83 and 83' are provided with trips which are located in the same vertical plane on the column stop bar 26. While these trips may be separate, I prefer when a plurality of totalizers are to be brought into action at the same time, to employ a single trip common to all of them. I therefore provide what may be termed a multiple trip 83×, constructed like the trip 83, except that its vertical dimensions are sufficient to present it in the paths of both triggers 81 and 81', see Figs. 18 and 20. By an obvious rearrangement of the trips, both of the computing devices 36 and 36' may take the character of grand computing devices, one computing the grand total of a plurality of columns and the other computing the grand total of certain of said columns or of others, as desired. In that event both master wheels would be equipped with retracting springs and both triggers would have pivoted ends or heads.

It is to be understood, that as certain features of the invention may be employed independently of others, or in somewhat different arrangement, accordingly as the invention may find expression in a calculating machine, a calculating and recording machine, or in a combined calculating and typewriting machine, I reserve the right to effect such changes, modifications and variations of the illustrated structure as may come fairly within the scope of the protection prayed.

What I claim is:—

1. In combination, a computing device, operating mechanism therefor, and a carriage supporting both the computing device and its operating mechanism and movable to change their denominational relation.

2. In combination, a computing device, operating keys therefor, and a carriage supporting said computing device and keys and movable to change the denominational relation thereof.

3. In combination, a movable carriage, a computing device and printing mechanism, both mounted on the carriage, and operating keys for the computing device, the movement of the carriage serving to effect denominational spacing of the digits printed.

4. In combination, a movable carriage, keys movable therewith, a computing device also movable with the carriage and operated by the keys, and key operated printing mechanism, arranged to print digits in denominational positions determined by the position of the carriage.

5. In combination, a movable carriage, a computing device and printing mechanism both movable with the carriage, and keys constituting operating means common to the computing device and printing mechanism and controlling the movement of the carriage.

6. In combination, a computing device, printing mechanism, operating keys common to both, and a carriage supporting the several recited elements and movable to different denominational positions.

7. In combination, a carriage, keys and a computing device, both mounted on the carriage, and key-operated actuating mechanism for the computing device, said carriage being movable to change the denominational relation of the computing device and its actuating mechanism.

8. In combination, a movable carriage, a computing device, and an actuator, the computing device and actuator being mounted on the carriage and having relative movement to present them in or out of co-operative relation, the position of said carriage determining the denominations of the digits included in the computation.

9. In combination, a movable carriage, a computing device including a series of denominational members, and an actuator, said computing device and actuator being movable with the carriage, but at different speeds, to cause the presentation of the actuator to successive denominational members.

10. In combination with a movable carriage, a computing device and an actuator, both mounted on the carriage and relatively movable by the advance of the carriage to present the actuator in operative relation with successive denominational members of the computing device.

11. In combination, a movable carriage, propelling mechanism therefor, a computing device including a series of denominational members, and an actuator advanced to successive members by the carriage propelling mechanism and movable at greater speed than the carriage.

12. In combination, a movable carriage, propelling mechanism therefor, a computing device, and an actuator, movable by the carriage propelling mechanism, to present the actuator in co-operative relation with successive denominational members of the computing device, said computing device being mounted on the carriage.

13. In combination, a computing device, operating mechanism therefor, a movable carriage supporting both the computing device and its operating mechanism and having its movement controlled by the latter.

14. In combination, a computing device, operating keys therefor, and a movable carriage supporting the computing device and keys and having its movement controlled by said keys.

15. In combination, a key-controlled carriage, and a computing device and printing mechanism mounted thereon.

16. In combination, a movable carriage, a computing device mounted thereon, and keys also mounted on the carriage and controlling the movement thereof, certain only of said keys being adapted to operate the computing device.

17. In combination, a movable carriage, a computing device and an actuator, both movable with the carriage and having relative movement to present the actuator in operative relation with successive denominational members, and keys controlling said relative movement.

18. In combination, a movable carriage, a computing device and an actuator, both movable therewith and having relative movement to present said actuator in operative relation to the successive denominational members of the computing device, and keys controlling such relative movement and also the operating movement of the actuator.

19. The combination with a typewriting machine, including a traveling carriage, printing mechanism, and keys for operating the printing mechanism and controlling the movement of the carriage, of a computing device movable as the carriage advances, and an actuator movable to successive denominational members of the computing device and operated by the keys.

20. The combination with a typewriting machine, including as primary elements thereof a frame and movable carriage, of a computing device and an actuator both mounted on one of said primary elements of the typewriter, and means mounted on the carriage for operating the actuator.

21. The combination with a typewriting machine, including as primary elements thereof a frame and movable carriage, of a computing device and an actuator both mounted on one of said primary elements of the typewriter, and actuator operating keys mounted on the carriage.

22. The combination with a flat platen typewriter including a movable carriage and key-operated printing mechanism mounted thereon, of a computing device mounted on the carriage, and an operating connection between the keys of the printing mechanism and the computing device.

23. The combination with a flat platen typewriter including a movable carriage, printing mechanism mounted on the carriage, and keys arranged to control the movement of the carriage and to operate the printing mechanism, of a computing device mounted on the carriage, an actuator also mounted on the carriage and movable to successive denominational members of the computing device, and an operating connection between the keys and the actuator.

24. The combination with a flat platen typewriter including a movable carriage, carriage propelling mechanism, printing mechanism and keys mounted on the carriage, and a key-operated escapement controlling the movement of the carriage, of a computing device mounted on the carriage and including a series of denominational members, a master wheel, means operated by the movement of the carriage for advancing the master wheel to successive denominational members of the computing device, and means operated by certain of the keys for rotating the master wheel.

25. The combination with a typewriting machine including a stationary flat platen, a traveling machine frame, a carriage movable on the frame, and printing mechanism mounted on the carriage and including numeral keys, of a computing device mounted on the carriage, and means for operating the computing device from the keys.

26. The combination with a flat platen typewriter including a stationary, flat platen, a machine frame mounted to travel thereover, a carriage movable on said frame, and printing mechanism including letter and numeral keys movable with and controlling the movement of the carriage, of a computing device mounted on the carriage and including a series of denominational members, an actuator movable by the advance of the carriage to engage successive members and differential connection between the numeral keys and the actuator, whereby the movement of said actuator will correspond in extent to the value of the key depressed.

27. The combination with a frame, a traveling carriage, printing mechanism, and numeral keys, of a computing device mounted on the carriage, an actuator for the computing device, and means movable with the carriage for transmitting a different degree of movement from each numeral key to the actuator.

28. The combination with a laterally movable carriage, of a computing device movable therewith, printing mechanism including letter and numeral keys also movable with the carriage, and actuating mechanism for the computing device including the numeral keys.

29. The combination with a stationary platen for the reception of a work sheet, and printing mechanism, of a carriage mounted to travel over the platen, a computing device movable with the carriage, and keys for moving the printing mechanism to the platen and for operating the computing device.

30. In combination, a platen and relatively movable printing mechanism, of a computing device, and a master operating means both movable with the printing mechanism, the denominational relation of the computing device and its master means being controlled by the movement of the printing mechanism, tabulating mechanism adapted to arrest such movement at any desired point within the limits thereof, and means whereby the computing device may be rendered operative by the master means at any desired point in the relative movement of the platen and printing mechanism.

31. The combination with a platen and printing mechanism, relatively movable, of tabulating mechanism including a stop and a coöperating catch for arresting said relative movement at a predetermined point, a computing device, operating mechanism therefor and means associated with the stop for determining that point in the relative movement of the platen and printing mechanism at which the computing device will be rendered operative.

32. The combination with a platen and printing mechanism, relatively movable, of an adjustable stop for arresting such movement at any desired point, a trip adjustable with the stop, a computing device and means operated by the trip for automatically bringing the computing device into action.

33. The combination with a platen and printing mechanism, relatively movable, of a computing device, an actuator normally out of coöperative relation therewith, a trip adjustable independently of the computing device to different column positions, and means controlled by the trip for establishing an operative relation between the computing device and its operating mechanism when the printing mechanism is disposed to print in a given column and for automatically establishing an inoperative relation of said parts to permit digits to be printed beyond the column without operating the computing device.

34. The combination with a stationary platen and printing mechanism mounted to travel thereover, of a computing device and a normally disengaged actuator therefor, relatively movable to present successive digit carriers of the computing device in operative relation with the operating mechanism, an adjustable trip and means operated by the trip at the proper point in the movement of the printing mechanism to inaugurate relative movement of the computing device and its actuator.

35. The combination with a platen and printing mechanism, relatively movable, of a computing device and an actuator therefor, also relatively movable, a trip adjustable independently of the computing device, means operated by the relative movement of the platen and printing mechanism for effecting the relative movement of the computing device and its actuator, and means operated by the trip for determining that point in the relative movement of the platen and printing mechanism at which the relative movement of the computing device and its actuator will be inaugurated by said first named means.

36. The combination with a typewriting machine, including printing mechanism, a frame, and a carriage movable on the frame, of a computing device, and means adjustable on the frame for determining that point in the advance of the carriage at which the computing device will be operative.

37. The combination with a typewriting machine, including printing mechanism, a frame, and a carriage movable on the frame, of a trip device adjustable on the frame, a computing device and means presented to the trip device by the movement of the carriage and arranged to render the computing device operative.

38. The combination with a typewriting machine, including printing mechanism, a frame, and a traveling carriage, of a scale bar carried by the frame, a trip adapted to be located at any desired point on the scale bar, a computing device, and means mounted on the carriage and co-operating with the trip to render the computing device operative at the proper time.

39. The combination with a typewriting machine, including printing mechanism, a frame, and a movable carriage, of a computing device mounted on the carriage, a trip mounted on the frame, a trigger mounted on the carriage and presentable to the trip, and means controlled by the trigger for rendering the computing device operative.

40. The combination with a typewriting machine, including printing mechanism, a frame, a movable carriage, and carriage propelling mechanism, of a computing device and an actuator therefor, means for causing the carriage propelling mechanism to effect relative movement of the computing device and its actuator, and means mounted on the machine frame for determining that point in the movement of the carriage at which the relative movement of the computing device and its actuator will be inaugurated.

41. The combination with a typewriting machine, including printing mechanism, a frame, a movable carriage, and carriage propelling mechanism, of a computing device, an actuator therefor, actuator advancing mechanism, a trigger and a trip presentable in co-operative relation by the movement of the carriage, and means controlled by the trigger for operatively connecting the actuator advancing mechanism with the carriage propelling mechanism.

42. The combination with a typewriting machine, including printing mechanism, a frame, a movable carriage, and carriage propelling mechanism, of a computing device, a master wheel therefor, master wheel advancing mechanism, a trip mounted on the frame, a trigger mounted on the carriage and presentable to the trip, and means controlled by the trigger for operatively connecting the master wheel advancing mechanism with the carriage propelling mechanism.

43. The combination with a platen and printing mechanism movable thereover, of a computing device movable with the printing mechanism, operating mechanism therefor, and means adjustable independently of the computing device for determining that point in the travel of the printing mechanism at which the computing device may be operated.

44. The combination with a platen and printing mechanism movable thereover, of a computing device movable with the printing mechanism, operating mechanism therefor, and means adjustable independently of the computing device and of the printing mechanism to determine that point in the travel of the printing mechanism at which the computing device may be operated.

45. The combination with a platen and printing mechanism mounted to travel thereover, of a computing device, an actuator normally out of operative relation therewith, means for moving the actuator into operative relation with the computing device, and means mounted independently of the movable printing mechanism and of the computing device for determining the point in the travel of the printing mechanism at which the computing device and its actuator will be disposed in co-operative relation.

46. The combination with a platen, a carriage movable thereover, and a computing device and printing mechanism mounted on the carriage, of a computing device, a trip adjustable independently of the carriage and computing device, and means controlled by the trip for establishing an operative relation between the printing mechanism and the computing device.

47. The combination with a platen, a carriage movable thereover, and printing mechanism mounted on the carriage, of a computing device, an actuator therefor, said device and actuator being relatively movable but normally stationary relative to each other during the travel of the carriage, and means mounted independently of the carriage for determining that point in the carriage advance at which the relative movement of the computing device and its actuator will be inaugurated.

48. In a typewriting machine, the combination with a platen, a machine frame, a carriage movable on the frame, and printing mechanism mounted on the carriage, of a computing device, an actuator therefor, which is normally stationary relative to the computing device during the movement of the carriage, actuator advancing mechanism, and means mounted on the machine frame to determine the point in the advance of the carriage at which the actuator advancing mechanism will be brought into action.

49. The combination with a typewriting machine, including a platen, a machine frame, a carriage movable on the frame, and printing mechanism mounted on the carriage, of a computing device, a master wheel therefor, master wheel advancing mechanism, a trip mounted on the machine frame, and means presented to the trip by the movement of the carriage and arranged to bring the master wheel advancing mechanism into operation at the proper time.

50. The combination with a typewriting machine, including a platen, a frame, and traveling printing mechanism, of a stop for arresting the movement of the printing mechanism, a computing device, operating mechanism therefor, and means associated with the stop for determining the point in the travel of the printing mechanism at which the computing device may be operated.

51. The combination with a typewriting machine, including a platen, a frame, a movable carriage, printing mechanism mounted on the carriage, and tabulating mechanism including a stop mounted on the frame to arrest the carriage at a predetermined point, of a trip associated with the stop, a computing device, operating mechanism therefor, and trip controlled means for establishing a co-operative relation between the computing device and its operating mechanism.

52. The combination with a typewriting machine, including a platen, a frame, a traveling carriage movable on the frame, and tabulating mechanism comprising a column stop bar mounted on the frame, a catch mounted on the carriage, and a column stop designed to be positioned at various points on the bar, of a computing device, and means adjustable along the column stop bar with the stop to determine that point in the travel of the carriage at which the computing device may be operated.

53. The combination with a typewriting machine, including a platen, a machine frame, a carriage movable on the frame, printing mechanism movable with the carriage, and tabulating mechanism comprising a column stop bar on the frame, a catch on the carriage, and a stop adapted to be located at various points on the column stop bar, of a trip adjustable along the bar with the stop, a computing device, operating mechanism therefor, which operating mechanism is normally out of operative relation with the computing device, and trip controlled means mounted on the carriage and arranged to effect an operative relation between the computing device and its operating mechanism.

54. The combination with a typewriting machine, including a platen, a machine frame, a carriage movable on the frame, printing mechanism mounted on the carriage, and tabulating mechanism comprising a column stop mounted on the frame and disposed to arrest the carriage at a predetermined point, of a computing device, an actuator therefor, actuator advancing means, and means associated with the stop and controlling the operation of the actuator advancing means.

55. The combination with a typewriter, including a platen, a frame, a carriage mounted to travel on the frame, printing mechanism movable with the carriage, and tabulating mechanism, including a column stop and a catch co-operating to arrest the carriage at a predetermined point, of a trip associated with one of said elements of the tabulating mechanism, a computing device, a master wheel, master wheel advancing means, and trip controlled means mounted on the carriage and arranged to bring the master wheel advancing means into action at the proper time.

56. The combination with a typewriter, including a platen, a frame, a traveling carriage, carriage propelling mechanism, and printing mechanism mounted on the carriage, of a computing device also mounted on the carriage, a master wheel therefor, master wheel advancing mechanism, and automatic means for connecting the master wheel advancing mechanism with the carriage propelling mechanism.

57. The combination with a typewriting machine, including a platen, a frame, a movable carriage, carriage propelling mechanism, and printing mechanism mounted on the carriage, of a computing device, a master wheel therefor, master wheel advancing mechanism, a trip mounted independently of the carriage, and trip controlled means for connecting the master wheel advancing mechanism with the carriage propelling mechanism.

58. The combination with a traveling carriage and printing mechanism mounted thereon, of a computing device also mounted on the carriage, a master wheel which is normally stationary relative to the computing device during the advance of the carriage, and means for inaugurating the advance of the master wheel at a proper point in the movement of the carriage.

59. The combination with a traveling carriage and printing mechanism movable therewith, of a computing device mounted on the carriage, an actuator normally out of operative relation with the computing device, and automatic means for establishing an operative relation between the computing device and the actuator at a predetermined point in the advance of the carriage.

60. The combination with a traveling carriage, printing mechanism mounted thereon and a support for the sheet to be written upon, of a computing device also mounted on the carriage, and automatic means controlling the operation of the computing device.

61. The combination with a traveling carriage, of printing mechanism and a computing device both mounted thereon, and means mounted on the carriage for making and breaking an operative connection between the printing mechanism and the computing device.

62. The combination with a typewriting machine, including a traveling carriage and carriage propelling mechanism, of a computing device and printing mechanism, both mounted on the carriage, an actuator also mounted on the carriage and arranged to be advanced relative to the computing device by the carriage propelling mechanism, and means mounted on the carriage and controlling the connection between the actuator and the carriage propelling mechanism.

63. The combination with a typewriting machine, including a frame, a carriage movable on the frame, and a computing device, an actuator therefor, and printing mechanism, all mounted on the carriage, of a trip mounted on the frame and controlling the relative movement of the computing device and its actuator.

64. The combination with a movable carriage, of a computing device, an actuator therefor, and printing mechanism, all mounted on the carriage, a trip mounted on the frame, a trigger mounted on the carriage and presentable to the trip, and means controlled by the trigger for effecting the relative movement of the computing device and its actuator.

65. The combination with a movable carriage, of a computing device, an actuator therefor, and printing mechanism, all mounted on the carriage, a trip mounted independently of the carriage, and means mounted on the carriage and controlled by the trip for causing the advance of the actuator across the computing device.

66. The combination with a typewriting machine, including a platen, a frame, a carriage movable on the frame, and carriage propelling mechanism, of a computing device, an actuator therefor, and printing mechanism, all mounted on the carriage, means operated by the movement of the carriage for advancing the actuator across the computing device, said means being normally inactive, and means for automatically inaugurating the advance of the actuator at a predetermined point in the advance of the carriage.

67. The combination with a typewriter, including a frame, a traveling carriage, and carriage propelling mechanism, of a computing device, an actuator therefor, and printing mechanism, all mounted on the carriage, normally inactive means for advancing the actuator across the computing device, a trip, and a co-operating trigger for bringing the actuator advancing means into action at the proper time.

68. The combination with a computing device and an actuator therefor, relatively movable to change their denominational relation, of means for effecting such relative movement, and a clutch controlling the operation of said means.

69. The combination with a computing device and an actuator therefor, relatively movable to change their denominational relation, of means for effecting such relative movement, a clutch controlling the operation of said means, and automatic clutch operating means.

70. The combination with a computing device and an actuator, relatively movable, of mechanism for effecting such relative movement, a clutch controlling the operation of said mechanism, a trigger controlling the operation of the clutch, and a trip co-operating with the trigger.

71. The combination with a computing device and an actuator therefor, of a movable carriage, normally inactive mechanism operated by the movement of the carriage to effect the relative movement of the computing device and its actuator, a clutch controlling the operation of said mechanism, and automatic clutch operating means including an adjustable trip.

72. The combination with a computing device and an actuator therefor, of a movable carriage, normally inactive mechanism operated by the movement of the carriage to effect the relative movement of the computing device and its actuator, a clutch controlling the operation of said mechanism, and a trigger operated by the movement of the carriage and controlling the operation of the clutch.

73. The combination with a computing device and an actuator therefor, of a movable carriage, normally inactive mechanism operated by the movement of the carriage for effecting the relative movement of the computing device and its actuator, a clutch controlling the operation of said mechanism, a trigger controlling the operation of the clutch, and an adjustable trip for operating the trigger through the movement of the carriage.

74. The combination with a traveling carriage, of a computing device and an actuator, both mounted on the carriage, mechanism for advancing the actuator across the computing device, a clutch controlling the operation of said mechanism, and automatic clutch operating mechanism.

75. The combination with a typewriting machine, including as primary elements thereof a frame and a traveling carriage, of a computing device and an actuator, both mounted on one of said primary elements of the typewriter, mechanism for advancing the actuator across the computing device, a clutch controlling the operation of said mechanism, and automatic clutch operating means.

76. The combination with a typewriting machine, including as primary elements thereof a frame and a traveling carriage, of a computing device and an actuator, both mounted on one of said primary elements of the typewriting machine, normally inactive mechanism for advancing the actuator across the computing device, a clutch controlling the operation of said mechanism, a trip mounted on one primary element of the typewriter, and a co-operating trigger mounted on the other primary element of the machine and controlling the operation of the clutch.

77. The combination with a typewriting machine, including a frame, a traveling carriage, and printing mechanism mounted on the carriage, of a computing device and an actuator, both mounted on the carriage, mechanism for advancing the actuator across the computing device, a clutch controlling the operation of said means, a trigger mounted on the carriage and controlling the operation of the clutch, and a trip mounted on the frame in the path of the trigger.

78. The combination with a typewriting machine, including a frame, a movable carriage, and a feed spindle for said carriage, of a computing device and an actuator, and mechanism operated by the feed spindle of the typewriter carriage for effecting relative movement of the computing device and its actuator.

79. The combination with a typewriter, including a frame, a movable carriage, and a feed spindle movable with the carriage, of a computing device, an actuator therefor, and means operated by the feed spindle for advancing the actuator across the computing device.

80. The combination with a movable carriage, and a feed spindle therefor, of a computing device, an actuator therefor, actuator advancing mechanism adapted to be intermittently connected with the feed spindle, and automatic means controlling such connection.

81. The combination with a movable carriage, and a carriage feed spindle, of a computing device, an actuator therefor, an actuator advancing rack, a loose gear on the spindle and engaging the rack, and a clutch for connecting said gear to the spindle.

82. The combination with a movable carriage, and a carriage feed spindle, of a computing device, an actuator therefor, an actuator advancing rack, a loose gear on the spindle and engaging the rack, a clutch for connecting said gear to the spindle, and means for automatically operating the clutch.

83. The combination with a typewriting machine, including a frame, a movable carriage, and a feed spindle, of a computing device and an actuator therefor, both mounted on the carriage, normally inactive mechanism adapted to be operated by the feed spindle to effect relative movement of the computing device and its actuator, and a clutch for intermittently connecting said mechanism with the feed spindle.

84. The combination with a typewriting machine, including a frame, a movable carriage, and a feed spindle, of a computing device and an actuator therefor, both mounted on the carriage, normally inactive mechanism adapted to be operated by the feed spindle to effect relative movement of the computing device and its actuator, a clutch for intermittently connecting said mechanism with the feed spindle, a trigger controlling the clutch, and a trip disposed to engage and operate the trigger.

85. The combination with a typewriter, including a frame, a traveling carriage, and a feed spindle, of a computing device and an actuator therefor, both mounted on the carriage, an actuator advancing rack, a gear wheel loose on the spindle and engaging the rack, a clutch for connecting the gear and spindle, a trigger mounted on the carriage and controlling the clutch, and a trip mounted on the frame in the path of the trigger.

86. The combination with a platen and printing mechanism movable over the platen to print several columns of numbers on a work sheet, of a computing device movable with the printing mechanism and including a series of denominational members, and means for imparting movement to the denominational member corresponding in order to the order of the numeral printed in any one of several columns, such movement corresponding in extent to the value of the numeral printed.

87. The combination with a platen and printing mechanism movable thereover to print several columns of numbers, of a grand totalizer movable with the printing mechanism and including a series of denominational members, and keys for operating the members of said grand totalizer to compute the grand total of several columns.

88. The combination with paper supporting means and movable printing mechanism designed to print several columns of numbers on a work sheet, of a computing device common to several columns and movable with the printing mechanism, and means whereby the computing device will be automatically connected with the printing mechanism whenever the printing mechanism is disposed to print in any one of the several columns to be included in the computation.

89. The combination with paper supporting means and printing mechanism movable opposite said means to print several columns of numbers on a work sheet, of a computing device common to several columns and movable with the printing mechanism, means whereby the computing device will be operatively connected with the printing mechanism whenever the printing mechanism is disposed to print in any one of several columns to be included in the computation, and keys constituting actuating means for the printing mechanism and computing device.

90. The combination with a platen and printing mechanism movable thereover to print several columns of numbers on a work sheet, of a computing device movable with the printing mechanism and adapted to effect a computation including the numbers in several columns, and operating connections for the computing device, said connections being adjustable by the movement of the printing mechanism and arranged to insure a co-operative relation between the computing device and the printing mechanism as the latter is disposed to print in different columns.

91. The combination with printing mechanism and means for effecting the relative step-by-step advance thereof to permit the printing of several columns on a work sheet, of a computing device movable with the printing mechanism, and means for operating said device to effect a computation including numbers in several columns.

92. The combination with printing mechanism movable to permit the printing of several columns on a work sheet, of a computing device movable with the printing mechanism as the latter advances from column to column, and means for operating said computing device when the printing mechanism is operated to print in either column, said means also serving to control the movement of the printing mechanism.

93. The combination with printing mechanism movable to permit several columns of numbers to be printed on a work sheet, of a computing device movable with the printing mechanism, and means for operating said computing device to compute a result with numbers in different columns included in the computation, said means also controlling the movement of the printing mechanism from column to column.

94. The combination with a movable carriage, of printing mechanism and a grand computing device, both mounted on the carriage and movable therewith, and means for operating said grand computing device to compute the result of the combined operations of the printing mechanism in connection with different columns, said means controlling the movement of the carriage.

95. The combination with a typewriter, including a platen, and printing mechanism movable thereover to permit the printing of columns at different points on a work sheet, of keys for operating said printing mechanism, a computing device movable with the printing mechanism as the latter advances from column to column, and means for operating the computing device to effect a computation embracing numbers in several columns.

96. The combination with a typewriter, including a stationary flat platen, printing mechanism mounted to travel thereover and adapted to print several columns of numbers on a work sheet supported by the platen, and operating keys for the printing mechanism, of a computing device movable with the printing mechanism, and means actuated by the keys for operating the computing device when a digit is printed in any one of several columns.

97. The combination with a typewriter, including a stationary flat platen, a machine frame mounted to travel thereover, a carriage movable on the frame, and printing mechanism mounted on the carriage and including letter and numeral keys, of a computing device movable with the carriage, and an actuator therefor disposed for operation by the numeral keys when the latter are moved to print a digit in any one of several parallel columns of numbers.

98. The combination with a typewriter, including a stationary platen, a traveling machine frame, a carriage movable on the frame, and printing mechanism mounted on the carriage and including operating keys controlling the step-by-step advance of the carriage, of a computing device mounted on the carriage and including a series of denominational members, actuating means therefor, means for advancing the actuating means to successive members of the computing when the printing mechanism is advanced to successive orders of any one of several columns of numbers, and means operated by the keys to move the actuator to an extent corresponding to the value of the digit printed in any of said columns.

99. The combination with two primary elements, to-wit, paper supporting means and printing mechanism, one of said elements being relatively stationary and the other movable to permit several columns of numbers to be printed on a work sheet, of a computing device adapted to effect a computation including digits in several of the columns and movable with one of the primary elements, and means adjustable on the stationary element to determine the location of the columns to be included in the computation and to render the computing device operative at the proper time.

100. The combination with two primary elements, to-wit, paper supporting means and printing mechanism, one of said elements being movable and the other relatively stationary, whereby a plurality of columns may be printed on a work sheet, of a computing device having denominational members and adapted to effect a computation embracing digits in several columns, an actuator adapted for presentation to said members and a plurality of relatively variable devices carried by the stationary element to automatically cause an operative relation to be established between the actuator and the printing mechanism and to inaugurate relative movement of the computing device and actuator.

101. The combination with two primary elements, to-wit, a platen and printing mechanism including keys, one of said elements being movable and the other relatively stationary to permit several columns to be printed on a work sheet, of a computing device having denominational members adapted to effect a computation embracing numbers printed in several columns, trips mounted on the stationary element, an actuator for the computing device and means operated by the trips through the relative movement of the primary elements, to cause an operative connection to be established between the keys and the computing device whenever the printing mechanism is in position to print in any one of the columns to be embraced in the computation, and to cause relative movement of the computing device and its actuator for the purpose of presenting the actuator and various denominational members in coöperative relation.

102. The combination with a typewriting machine, including printing mechanism, a frame, and a carriage movable on the frame to permit several columns of numbers to be printed on a work sheet, of a computing device adapted to effect a computation embracing numbers in several columns, and means mounted on the frame and arranged to cause said computing device to be brought into action whenever the printing mechanism moves to a position opposite any denominational position of any one of the columns to be embraced in the computation.

103. The combination with a typewriting machine, including printing mechanism, a frame, and a carriage movable on the frame to permit several columns of numbers to be printed on a work sheet, of a computing device having denominational members and adapted to effect a computation embracing numbers printed in several columns, and means mounted on the machine frame for causing an operative relation to be established between the printing mechanism and any appropriate member of the computing device whenever the printing mechanism is disposed to print in any one of the several columns to be embraced in the computation.

104. The combination with a typewriting machine, including printing mechanism, a frame, and a carriage movable on the frame to permit several columns of numbers to be printed on a work sheet, of a computing device movable with the carriage and adapted to effect a computation embracing numbers in several columns, and means spaced at intervals on the frame for causing an operative relation to be established between the printing mechanism and the computing device whenever the printing mechanism is disposed to print in one of the columns to be included in the computation.

105. The combination with a typewriting machine, including printing mechanism, a frame, and a carriage movable on the frame to permit several columns of numbers to be printed on a work sheet, of a computing device having denominational members and adapted to effect a computation embracing numbers printed in several columns, a plurality of trips, and means controlled by said trips for establishing an operative relation between the printing mechanism and the computing device whenever the printing mechanism is disposed to print in one of the columns to be included in the computation and for causing successive denominational members to be rendered operative.

106. The combination with a typewriting machine, including printing mechanism, a frame, and a carriage movable on the frame to permit several columns of numbers to be printed on a work sheet, of a computing device having denominational members and adapted to effect a computation including numbers printed in several columns, a plurality of trips mounted on the frame, and means operated by said trips for causing an operative relation to be established between the printing mechanism and the computing device whenever said printing mechanism is disposed to print in any of the columns to be included in the computation and for causing different denominational members to be rendered operative.

107. The combination with a typewriting machine, including printing mechanism, a frame, and a traveling carriage, of a computing device having denominational members, a plurality of trips mounted on the frame, a trigger mounted on the carriage and disposed to be operated by the trips, and means, controlled by said trigger, for establishing an operative relation between the computing device and the printing mechanism and for causing successive denominational members to be rendered operative by the advance of the carriage.

108. The combination with a typewriting machine, including a frame, printing mechanism, and a traveling carriage, of a computing device mounted on the carriage and adapted to effect a computation embracing numbers printed in several columns, and means for effecting an operative connection between the computing device and printing mechanism whenever the printing mechanism is disposed to print in one of the columns to be embraced in the computation, said means including a plurality of devices at least one of which is adjustable independently of the computing device to different column positions.

109. The combination with a typewriting machine, including printing mechanism, a frame, and a carriage movable on the frame to permit numbers to be printed in several columns, of a computing device mounted on the carriage and adapted to effect a computation embracing numbers printed in several columns, and automatic means for establishing an operative relation between the computing device and printing mechanism whenever said printing mechanism is disposed to print in one of the columns to be embraced in the computation, said means including a plurality of devices adjustable to different column positions.

110. The combination with a typewriting machine, including a frame, printing mechanism, and a carriage movable on the frame to permit several columns of numbers to be printed on a work sheet, of a computing device mounted on the carriage and adapted to effect a computation embracing numbers printed in several columns, whether said columns are closely or widely spaced apart and means including a plurality of relatively adjustable devices located at intervals and serving successively to cause an operative relation to be established between the computing device and the printing mechanism regardless of the relative locations of the columns.

111. The combination with a typewriting machine, including a frame, printing mechanism, and a carriage movable on the frame, of a computing device mounted on the carriage, and relatively adjustable devices spaced at intervals on the frame to successively cause an operative relation to be established between the computing device and the printing mechanism.

112. The combination with a typewriting machine, including a frame, printing mechanism, and a traveling carriage, of a computing device mounted on the carriage, a plurality of trips spaced at intervals on the frame and relatively adjustable to different column positions, and trip controlled means for establishing an operative relation between the printing mechanism and the computing device.

113. The combination with a typewriting machine, including printing mechanism, a frame, and a carriage movable on the frame, of a computing device mounted on the carriage, a plurality of trips mounted on the frame, a trigger mounted on the carriage and disposed for actuation by the trips, and means controlled by said trigger for establishing an operative relation between the printing mechanism and the computing device.

114. The combination with a typewriting machine, including a frame, printing mechanism, and a traveling carriage, of a computing device and an actuator therefor, both mounted on the carriage, normally inactive mechanism for effecting the relative movement of the computing device and its actuator to cause the presentation of the actuator to successive digit carriers, and automatic means for bringing said mechanism into action at a plurality of points in a single traverse of the frame by the carriage.

115. The combination with a typewriting machine, including a frame, printing mechanism, and a movable carriage, of a computing device mounted on the carriage, an actuator therefor, actuator advancing mechanism, and a plurality of spaced devices for causing successive operations of the actuator advancing mechanism.

116. The combination with a typewriting machine, including a frame, printing mechanism, and a carriage movable on the frame, of a computing device and an actuator therefor, both mounted on the carriage, normally inactive actuator advancing mechanism, a plurality of trips mounted on the frame, and means operated by said trips for causing the actuator advancing mechanism to be brought into action at a plurality of points in the traverse of the frame by the carriage.

117. The combination with a computing device and its actuator, relatively movable, of mechanism for effecting such relative movement, a clutch controlling said mechanism, a plurality of devices for successively causing the automatic actuation of the clutch, and means for operating the actuator.

118. The combination with a frame, a traveling carriage, and printing mechanism, of a computing device, a plurality of stops for arresting the carriage at different points, and means associated with said stops for successively causing an operative relation to be established between the computing device and the printing mechanism.

119. The combination with a typewriting machine, including a frame, printing mechanism, a movable carriage, and tabulating mechanism for arresting the carriage at a plurality of points in a single traverse of the frame by said carriage, of a computing device, and means associated with the tabulating mechanism for successively establishing an operative relation between the computing device and the printing mechanism.

120. The combination with a typewriting machine, including a frame, printing mechanism, and a traveling carriage, of tabulating mechanism including a plurality of column stops mounted on the frame, trips associated with said stops, and trip controlled means for establishing an operative relation between the printing mechanism and the computing device.

121. The combination with a typewriting machine, including a frame, printing mechanism, and a movable carriage, of a computing device, tabulating mechanism including a plurality of column stops, trips associated with said stops, a trigger operated by said trips, and trigger controlled means for operatively connecting the printing mechanism with the computing device.

122. In a typewriting machine, the combination with a frame, printing mechanism, and a movable carriage, of a computing device mounted on the carriage, tabulating mechanism including a plurality of column stops, and means associated with said stops and controlling the operative relation between the printing mechanism and the computing device.

123. The combination with a movable carriage, of a plurality of computing devices, and operating mechanism for the computing devices, said computing devices and their operating mechanism being movable with the carriage.

124. The combination with a movable carriage, of a plurality of computing devices and operating mechanism therefor, all movable with the carriage, said operating mechanism including keys.

125. The combination with a plurality of computing devices, of a traveling carriage supporting the same, and operating mechanism for said computing devices including numeral keys movable with and controlling the movement of the carriage.

126. The combination with a plurality of computing devices, each including a series of digit carriers, of a traveling carriage supporting the computing devices, operating mechanism for the computing devices, presentable through the movement of the carriage into operative relation with successive digit carriers, said operating mechanism including numeral keys movable with the carriage.

127. The combination with a movable carriage, of a plurality of computing devices movable with the carriage and each including a series of digit carriers, numeral keys movable with and controlling the movement of the carriage, and connections whereby said keys, when operated, effect the differential movement of the digit carriers.

128. The combination with a flat platen and printing mechanism movable thereover, of keys for operating the printing mechanism, a plurality of computing devices movable with the printing mechanism, and means for operating one of said computing devices upon the depression of a key of the printing mechanism.

129. The combination with a typewriting machine, comprising a machine frame having carriage guides and a carriage mounted to travel on said guides, and printing mechanism mounted on the carriage and including letter and numeral keys, of a plurality of computing devices, one of which is mounted on the carriage, and mechanism for operating the computing devices from the numeral keys.

130. The combination with a typewriting machine, comprising a machine frame, a carriage mounted to travel thereon, and printing mechanism mounted on the carriage, of a plurality of computing devices also mounted on the carriage, and mechanism for operating said computing devices from the numeral keys.

131. The combination with a stationary platen and printing mechanism movable to permit a plurality of columns to be printed on a work sheet, of a plurality of computing devices movable with the printing mechanism and designed for use with reference to different columns.

132. The combination with a platen and movable printing mechanism, and keys, of a plurality of computing devices, at least one of which is movable with the printing mechanism and independent mechanisms for operatively connecting the keys with the respective computing devices.

133. The combination with a typewriter, including a frame, printing mechanism, and a movable carriage, of a plurality of computing devices mounted on the carriage, a plurality of independently adjustable trips arranged on the frame, and trip controlled means for establishing a coöperative relation between the printing mechanism and either computing device.

134. The combination with a typewriter, including a frame, printing mechanism, and a movable carriage, of a plurality of computing devices, each including a series of denominational members and carrying means tabulating mechanism for arresting the carriage at different points, and means adjustable with an element of the tabulating mechanism to determine those points in the travel of the carriage at which the computing devices may be operated.

135. The combination with a typewriting machine, including a frame, printing mechanism, and a movable carriage, of a plurality of computing devices, a plurality of trips located in different planes and appropriate to the respective computing devices, triggers located in different planes to engage the trips, and trigger controlled means for connecting the computing devices with the printing mechanism.

136. The combination with a typewriting machine, including a frame, printing mechanism, and a traveling carriage, of a plurality of computing devices mounted on the carriage, a plurality of column stops mounted on the frame, means engaging the stops to arrest the carriage, trips associated with the stops, and trip controlled means for bringing the computing devices into operation.

137. The combination with a plurality of computing devices, of independent actuators therefor, operating means common to the actuators, trip mechanism and independent trip controlled actuator advancing mechanisms.

138. The combination with a platen and printing mechanism movable relative thereto, of two computing devices, one of which is adapted to effect a computation including the computation effected by the other, one of said computing devices being movable with the printing mechanism in the direction of letter spacing.

139. The combination with a platen and printing mechanism movable relative thereto, of two computing devices movable with the printing mechanism in the direction of letter spacing, one of said devices being adapted to effect a computation embracing the computation effected by the other.

140. The combination with a platen and printing mechanism movable relative thereto, of two computing devices movable with the printing mechanism in the direction of letter spacing, one of said computing devices being adapted to effect a computation embracing the computation effected by the other, and numeral keys constituting operating means common to both computing devices.

141. The combination with a typewriter, including a flat platen, printing mechanism movable thereover, and letter and numeral keys, of two computing devices movable with the printing mechanism, one of said devices being adapted to effect a computation embracing the computation effected by the other, and provision whereby corresponding digit carriers of the computing devices may be operatively connected to the numeral keys.

142. The combination with a typewriter, including a flat platen, a traveling machine frame, a carriage movable on said frame, and printing mechanism including letter and numeral keys movable with, and controlling the movement of the carriage, of two computing devices mounted on the carriage and each including a series of digit carriers, and provision whereby corresponding digit carriers of the computing devices may be operatively connected with a numeral key for simultaneous actuation thereby.

143. The combination with a frame, a movable carriage, and printing mechanism whereby a plurality of parallel columns of numbers may be printed on a work sheet, of a computing device movable with the carriage, and means for automatically establishing a coöperative relation between the printing mechanism and the computing device when said printing mechanism is disposed to print numbers in any one of several columns whereby the grand total of said columns will be computed and registered as said columns are printed.

144. The combination with a platen and printing mechanism movable thereover to permit the printing of several columns of numbers, of a column totalizer adapted to compute the total of the numbers printed in a column, and a grand totalizer movable with the printing mechanism and adapted to compute the grand total of several columns.

145. The combination with a platen and printing mechanism movable thereover to permit several columns of numbers to be printed on a work sheet, of a column totalizer movable with the printing mechanism and adapted to compute the total of a column, and a grand totalizer arranged to compute the grand total of several columns.

146. The combination with a frame, a movable carriage, and printing mechanism, whereby a plurality of columns may be printed on a work sheet, of a column totalizer arranged to compute the total of one of the columns, and a grand computing device arranged to compute the grand total of a plurality of columns, one of said computing devices being mounted on the carriage.

147. The combination with a frame, a movable carriage, and printing mechanism, whereby a plurality of columns may be printed on a work sheet, of a column totalizer arranged to compute the total of a column, a grand totalizer arranged to compute the grand total of several columns, keys operatively related to the printing mechanism and arranged to actuate the column totalizer, and means for actuating the grand totalizer whenever a digit is printed in any one of the several columns to be included in the grand total, at least one of said totalizers being movable with the carriage.

148. The combination with a typewriting mechanism movable to permit the printing of several columns of numbers, of a column computing device and a grand computing device, means for operating the typewriting mechanism, mechanism operated by said means for operating the column computing device and the grand computing device, and means adjustable independently of the computing devices to determine the location of the columns to be embraced in the computation to be effected by said devices.

149. The combination with a frame, a movable carriage, and printing mechanism whereby a plurality of columns may be printed on a work sheet, of a plurality of totalizers each adapted to effect a computation embracing digits printed on the sheet, and at least one of which is movable with the carriage and means spaced at intervals on the frame to cause an operative relation to be established between the printing mechanism and one of said computing devices whenever said printing mechanism is disposed to print in any one of several columns.

150. The combination with a frame, a movable carriage, and printing mechanism, of a plurality of computing devices, each including a plurality of denominational members and carrying means, a trip controlling the operation of the several denominational members of one computing device, and a plurality of trips controlling the operation of the other computing device.

151. The combination with a frame, a movable carriage, and printing mechanism, of a plurality of computing devices, each including a plurality of denominational members and carrying means, a trip mounted on the frame, means controlled by said trip for establishing a co-operative relation between the printing mechanism and the several denominational members of one of the computing devices at a predetermined point in the advance of the carriage, a plurality of additional trips, and means controlled thereby for establishing a co-operative relation between the printing mechanism and another computing device at a plurality of points in the advance of the carriage.

152. The combination with a frame, a movable carriage, and printing mechanism, of tabulating mechanism for arresting the carriage at predetermined points in its advance to facilitate the printing of several columns, a column computing device, a grand computing device, and means associated with the tabulating mechanism to cause a co-operative relation to be automatically established between the printing mechanism and the column computing device when said printing mechanism is disposed to print in one column, and to cause a co-operative relation to be automatically established between the printing mechanism and another computing device whenever said printing mechanism is disposed to print in any one of several columns.

153. The combination with a frame, a traveling carriage, and printing mechanism of tabulating mechanism for arresting the carriage at different points to facilitate the printing of several columns, a column computing device and a grand computing device, spaced trips associated with the tabulating mechanism, means controlled by one of said trips for operatively connecting the printing mechanism with the column computing device, and mechanism controlled by a plurality of said trips for successively establishing a co-operative relation between the printing mechanism and the grand computing device.

154. The combination with a frame, a traveling carriage, and printing mechanism, of tabulating mechanism including column stops arranged to arrest the carriage at different points, a column computing device, a grand computing device, a plurality of trips associated with the column stops, mechanism controlled by a single trip for connecting the column computing device with the printing mechanism, and mechanism controlled by a plurality of the trips for successively effecting the operative connection of the printing mechanism with the grand computing device.

155. The combination with a frame, a movable carriage, and printing mechanism, of a column computing device and a grand computing device, a trigger controlling the operation of each computing device, a trip located in the path of one trigger, and a plurality of trips located in the path of the other trigger.

156. The combination with a typewriting machine, including a flat platen, a carriage movable thereover, and printing mechanism movable with the carriage, of a column computing device and a grand computing device, both mounted on the carriage, a trip mounted on the frame and controlling the operation of the column computing device, and a plurality of trips mounted on the frame and controlling the operation of the grand computing device.

157. The combination with a typewriting machine, including a frame, a movable carriage, and printing mechanism, of a column stop bar, a combined column stop and trip arranged to be located at any desired point on the bar, a catch arranged to engage the column stop to arrest the carriage, and a computing device the operation of which is controlled by the trip.

158. The combination with a platen, and printing mechanism mounted to travel thereover, of a computing device, an actuator normally out of operative relation therewith, means for moving the actuator into operative relation with the computing device, and a trip for determining the point in the travel of the printing mechanism at which the computing device and its actuator will be disposed in co-operative relation.

159. The combination with a type writing machine including a platen, a frame, a carriage movable on the frame, and tabulating mechanism including a column stop bar mounted on the frame, a catch mounted on the carriage and a column stop designed to be positioned at various points on the bar, of a computing device, and means adjustable along the column stop bar to determine that point in the travel of the carriage at which the computing device will be rendered operative.

160. The combination with a typewriting machine comprising a machine frame having carriage guides, a carriage mounted to travel on said guides, and printing mechanism mounted on the carriage and including numeral keys, of a plurality of computing devices one of which is mounted on the carriage, and mechanism for operating the computing devices.

161. The combination with a laterally movable carriage, of a plurality of computing devices, at least one of which is movable with the carriage, and computing device operating mechanism movable laterally with the carriage.

162. The combination with a frame and a series of depressible keys, mounted to travel relative to the frame, of two computing devices, one of which is adapted to effect a computation including the computation effected by the other, one of said computing devices being mounted to travel with the keys and operated upon the depression thereof.

163. The combination with a frame, a movable carriage, and printing mechanism, whereby a plurality of columns may be printed on a work sheet, of a column totalizer arranged to compute the total of one of the columns, and a grand computing device arranged to compute the grand total of a plurality of columns simultaneously with the printing of the digits in such columns, both the column totalizer and the grand computing device being movable with the carriage.

164. The combination with a traveling series of depressible keys, of a plurality of totalizers traveling with the keys and arranged to be operated upon the depression thereof.

165. The combination with a frame, and a traveling series of keys, of tabulating mechanism for arresting the keys at predetermined points in the advance thereof, a column computing device, a grand computing device, and means associated with the tabulating mechanism to cause a coöperative relation to be automatically established between the keys and both computing devices.

166. In combination, a computing device including denominational members, an actuator therefor, means for operating the actuator, and a carriage supporting the computing device and actuator and movable to cause an operative relation to be established between the actuator and successive denominational members of the computing device.

167. In combination, a computing device including a series of denominational members, an actuator therefor, a carriage supporting both the computing device and the actuator and movable to cause an operative relation to be established between the actuator and successive denominational members, and keys arranged to operate the actuator and to control the movement of the carriage.

168. In combination, a computing device including a series of denominational members, common operating keys therefor, and a carriage supporting the computing device and keys and movable to cause an operative relation to be established between the keys and successive denominational members.

169. In combination, a computing device including a series of denominational members, operating keys common to said members, and a carriage supporting the computing device and the keys and movable to cause an operative relation to be established between the keys and successive denominational members, such movement of the carriage being controlled by the keys.

170. In combination, a movable carriage, printing mechanism and a computing device including a series of denominational members, both mounted on the carriage, and operating means for the computing device, the movement of the carriage serving to effect denominational spacing of the digits printed and to cause an operative relation to be established between the operating means and successive denominational members of the computing device.

171. In combination, a computing device including a series of denominational members and an actuator common to said members, both the computing device and its actuator being bodily movable and having relative movement to change their denominational relation.

172. In combination, printing mechanism movable to different denominational positions, a computing device movable with the printing mechanism, and an actuator for the computing device, the computing device and its actuator having relative movement to change their denominational relation as the denominational position of the printing mechanism is changed.

173. In combination, a computing device and an actuator, both movable in the same direction, but at different speeds to change their denominational relation.

174. In combination, a computing device, operating mechanism therefor, a movable carriage supporting both the computing device and its operating mechanism and having its movement controlled by the latter, and means whereby the movement of the carriage will change the denominational relation of the computing device and its operating mechanism.

175. In combination, a key controlled carriage, a computing device and printing mechanism mounted on the carriage, and an actuator for the computing device, the movement of the carriage serving to change the denominational position of the printing mechanism and to effect a corresponding change in the denominational relation of the computing device and its actuator.

176. The combination with a typewriting machine including a traveling carriage, of a computing device mounted on the carriage and having denominational members, adjustable means for rendering the computing device operative during a predetermined period within the limits of the carriage travel, and means for arresting the movement of the carriage to permit the printing of a digit in the desired denominational position and the actuation of the corresponding denominational member of the computing device.

177. In combination, printing mechanism movable to space the characters printed in a line, a computing device movable with the printing mechanism and having denominational members, adjustable column selective means for rendering the computing device operative during a given period within the limits of travel of the printing mechanism, and denominational selective means for arresting the printing mechanism opposite any desired denominational order and for simultaneously rendering operative the corresponding denominational member of the computing device.

178. In combination, traveling printing mechanism, propelling mechanism therefor, an escapement controlling the travel of the printing mechanism, a computing device mounted to travel with the printing mechanism and having denominational members, operating mechanism for the computing device, adjustable column selective means for determining the location of the column to be computed, and denominational selective means arranged to release the printing mechanism and to subsequently arrest the latter opposite the desired denominational order of the column and to cause the establishment of a coöperative relation between the operating mechanism and the corresponding denominational member of the computing device.

179. In combination, a platen a movable carriage and printing mechanism, of a computing device having a series of denominational members, a master actuator therefor movable with the carriage, a series of keys, means whereby the computing device may be rendered operative by the keys through the medium of the actuator at any desired point within the limits of the relative movement of the platen and printing mechanism, and tabulating mechanism for arresting the movement of the carriage at the proper point to permit the printing of a digit in any desired denominational position and the operation of the corresponding denominational member of the computing device upon the depression of a key.

180. In combination, a key controlled carriage, a computing device movable with the carriage and having a series of denominational members, and a master means also movable with the carriage and arranged to operate the denominational members in succession.

181. In combination, a power propelled and escapement controlled carriage, and a computing device and operating means therefor, both movable with the carriage.

182. In combination, a stationary platen, a carriage movable both longitudinally and laterally of the platen, keys controlling the movement of the carriage in one direction, printing mechanism mounted on the carriage, and a computing device movable with the carriage and arranged to be operated upon the movement of a key.

183. In combination, paper supporting means, printing mechanism movable opposite the paper supporting means to effect denominational spacing of the digits printed, and a counter operatively related to the printing mechanism and movable therewith.

184. In combination, paper supporting means, printing mechanism movable opposite said means to print a line, a computing device movable with the printing mechanism, but normally inoperative thereby, and means for automatically rendering the computing device operative by the printing mechanism at a given point in the travel of the latter.

185. In combination, paper supporting means, printing mechanism movable to print a line of characters, a computing device movable with the printing mechanism and including a series of denominational members, and means for establishing a coöperative relation between the printing mechanism and successive denominational members of the computing device.

186. In combination, a series of keys and a computing device mounted to travel together in one direction, and means operated during the travel of said parts to effect a coöperative relation between the keys and the computing device.

187. In combination, a computing device and a series of keys mounted to travel together, said computing device including a series of denominational members, and a key-operated master means presentable to the successive denominational members as the computing device and keys advance.

188. The combination with a platen and printing mechanism, relatively movable, of a plurality of computing devices each including a plurality of denominational members, a plurality of relatively variable trips, and a plurality of trip controlled mechanisms each arranged to cause an operative relation to be established between the printing mechanism and the several denominational members of a computing device.

189. The combination with a plurality of computing devices each including a series of denominational members, of operating keys common to said devices, and a plurality of separate automatically operated mechanisms each including a trip adjustable to different column positions independently of the computing devices and each arranged to establish a coöperative relation between the keys and the several denominational members of a computing device.

190. The combination with two primary elements, to-wit, paper supporting means and printing mechanism, one of said elements being relatively stationary and the other movable to permit several columns of numbers to be printed on a work sheet, of a computing device movable with one of the primary elements in the direction of letter spacing and common to several columns, and means carried by one of the primary elements to cause the computing device to be rendered operative whenever the printing mechanism is disposed to print in any one of the several columns to which the computing device is common, said means being adjustable to different column positions independently of the computing device.

191. In combination, a computing device having denominational members, operating mechanism for the computing device, digit printing mechanism, and a traveling carriage supporting both the computing device and its operating mechanism and movable to change the denominational relation thereof and to effect denominational spacing of the printed digits.

192. In combination, a computing device having denominational members and carrying means, a master actuator for the denominational members, and a carriage supporting both the computing device and its master actuator and movable to cause any denominational member of the computing device to be rendered operative by the actuator.

193. In combination, a computing device having denominational members and carrying means, digit printing mechanism, operating keys common to the computing device and printing mechanism and all adapted to be operatively related to any given denominational member at the same time to enable said member to be operated by any one of said keys, and a carriage supporting the computing device, printing mechanism and keys, and movable under the control of said keys to effect denominational spacing of the digits printed and to render the proper denominational members operative upon the depression of the keys.

194. The combination with a typewriter including a carriage, keys, and printing mechanism, of adding mechanism normally wholly disconnected from the keys, and mechanism arranged to automatically connect and disconnect the keys and adding mechanism during the advance movement of the carriage and also during the retractile movement thereof, said mechanism including two members brought into engagement by the movement of the carriage, one of said members being displaced from its normal plane by the other and held back thereby as one member moves past the other, and means for returning the displaced member to its normal plane immediately upon the disengagement of the members.

195. The combination with a typewriter including a carriage, keys, and printing mechanism, of adding mechanism normally wholly disconnected from the keys, and mechanism arranged to automatically connect the keys and adding mechanism when the carriage moves into the adding field from either side thereof and to automatically disconnect the keys and adding mechanism when the carriage moves out of the adding field in either direction, said mechanism including members brought into engagement by the carriage at a given point in its travel to cause the displacement of one member from its normal plane and the consequent connection of the keys and adding mechanism as the carriage reaches the adding field, and means for returning the displaced member to its normal plane to disconnect the keys and adding mechanism when the carriage moves beyond the adding field.

196. The combination with a typewriter including a carriage, keys, and printing mechanism, of adding mechanism including an actuator normally disconnected from the keys, and means for automatically connecting the actuator and keys when the carriage moves into the adding field from either side thereof, said means including two members brought into engagement by the movement of the carriage in either direction to cause one of said members to be displaced from its normal plane by the other, one of said members being substantially coincident with the width of the adding field, means operated by the displaceable member to cause automatic connection of the keys and adding mechanism whenever said member is displaced, and means for moving the displaced member in the reverse direction to restore the same to its normal plane and thus effect the disconnection of the keys and adding mechanism when the carriage moves out of the adding field in either direction.

197. The combination with a typewriter including a carriage, keys, and printing mechanism, of adding mechanism normally wholly disconnected from the keys, two members arranged to be brought into engagement by the movement of the carriage in either direction and to travel one past the other, one of said members being approximately coincident in length with the width of the adding field and one of said members being displaceable from its normal plane by movement in the same direction when engaged by either end of the other member during the movement of the carriage in either direction, and means operated by the displaceable member to connect the keys and adding mechanism whenever said member is displaced.

198. The combination with a typewriter including a carriage, keys, and printing mechanism, of adding mechanism normally wholly disconnected from the keys, two members arranged to be brought into engagement by the movement of the carriage in either direction and to travel one past the other, one of said members being approximately coincident in length with the width of the adding field and one of said members being displaceable from its normal plane by movement in the same direction when engaged by either end of the other member during the movement of the carriage in either direction, means operated by the displaceable member to connect the keys and adding mechanism whenever said member is displaced, and means for moving the displaceable member back to its normal plane when said members are moved out of engagement by the carriage.

199. The combination with a typewriter including a reciprocatory carriage, keys, and printing mechanism, of adding mechanism including an actuator and operating connections therefor normally disconnected from the keys, means including a member movable in one direction only from its normal plane to connect the keys and the actuator operating connections, and means whereby the movement of the carriage in either direction will operate said member to effect such connection as the carriage moves into the adding field from either side thereof.

200. The combination with a typewriter including a reciprocatory carriage, keys, and printing mechanism, of adding mechanism including an actuator and actuator operating connections normally disconnected from the keys, means including a member movable in one direction only from its normal plane to connect the keys and the actuator operating connections, means whereby the movement of the carriage in either direction will operate said member to effect such connection as the carriage moves into the adding field from either side thereof, and means brought into action by the movement of the carriage in either direction to restore said member to its normal position and thus cause the disconnection of the keys and actuator when the carriage moves out of the adding field.

201. The combination with a typewriter including a frame, a carriage, keys, and printing mechanism, of means for causing the establishment of a coöperative relation between the keys and adding mechanism when the carriage moves into the adding field from either side thereof and for destroying such coöperative relation between the keys and adding mechanism when the carriage moves out of the adding field in either direction, said means including a member movable with the carriage and also movable relative to the carriage to control the coöperative relation between the keys and adding mechanism, and a second member mounted on the frame of the typewriter, the movement of the carriage serving to move said members into and out of coöperative relation.

202. In combination, a carriage, a series of denominational members and operating means, both the members and their operating means being movable with the carriage, and means whereby the movement of the carriage will cause a coöperative relation to be established between the operating means and a denominational member.

203. In combination, a carriage, a series of denominational members and operating means therefor, both movable with the carriage, and means whereby the movement of the carriage will cause a coöperative relation to be established between the operating mechanism and successive denominational members.

204. In combination, a carriage, a series of denominational members, and a master actuator therefor, both the denominational members and actuator being movable with the carriage, and means whereby the movement of the carriage will cause a coöperative relation to be established between the keys and the master means during a portion only of the carriage travel.

205. The combination with a typewriter including keys, printing mechanism and a movable carriage, of a register mounted on the carriage, register operating mechanism normally wholly disconnected from the keys, and means for automatically effecting an operative relation between the keys and the register operating mechanism at a given point in the travel of the typewriter carriage.

206. The combination with a typewriter including keys, printing mechanism and a movable carriage, of a register mounted on the carriage, register operating means normally disconnected from the keys, and means for effecting an operative relation between the register operating means and the keys at a given point in the forward movement of the carriage and also at a given point in the backward or retractile movement of said carriage.

207. The combination with a typewriter including keys, printing mechanism, and a carriage movable to permit printing within the limits of a column or adding field and also at opposite sides of said field, of a register movable with the carriage, register operating mechanism normally disconnected from the keys to avoid burdening of the latter when printing outside of the adding field or column, and mechanism brought into action by the movement of the typewriter carriage in either direction to effect a coöperative relation between the register operating mechanism and the keys when the printing mechanism and the adding field are brought opposite one another by the movement of the carriage.

In testimony, that I claim the foregoing as my own, I have hereto affixed my signature in the presence of two witnesses.

LOUIS G. JULIHN.

Witnesses:
 JOHN H. SIGGERS,
 BLANCHE J. KALDENBACK.